(12) United States Patent
Dunbar et al.

(10) Patent No.: US 12,432,137 B2
(45) Date of Patent: Sep. 30, 2025

(54) NETWORK LAYER SUPPORT FOR 5G EDGE COMPUTING STICKY SERVICES

(71) Applicant: Huawei Technologies Co., Ltd., Shenzhen (CN)

(72) Inventors: Linda Dunbar, Plano, TX (US); Kaippallimalil Mathew John, Addison, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 363 days.

(21) Appl. No.: 18/303,428

(22) Filed: Apr. 19, 2023

(65) Prior Publication Data

US 2023/0261984 A1    Aug. 17, 2023

Related U.S. Application Data

(63) Continuation of application No. PCT/US2021/056008, filed on Oct. 21, 2021.

(60) Provisional application No. 63/125,187, filed on Dec. 14, 2020, provisional application No. 63/104,293, filed on Oct. 22, 2020.

(51) Int. Cl.
*H04L 45/74*    (2022.01)
*H04L 45/00*    (2022.01)
*H04W 40/02*    (2009.01)

(52) U.S. Cl.
CPC .............. *H04L 45/38* (2013.01); *H04L 45/74* (2013.01); *H04W 40/02* (2013.01)

(58) Field of Classification Search
CPC ......... H04L 45/34; H04L 45/38; H04L 45/74; H04L 45/742; H04L 45/748; H04W 40/02; H04W 40/026; H04W 40/24; H04W 40/248
See application file for complete search history.

(56) References Cited

U.S. PATENT DOCUMENTS

| | | | |
|---|---|---|---|
| 2006/0130064 A1* | 6/2006 | Srivastava | H04L 67/1008 718/102 |
| 2016/0006654 A1* | 1/2016 | Fernando | H04L 45/74 370/392 |

OTHER PUBLICATIONS

Dunbar et al., "IPV6 Solution for 5G Edge Computing Sticky Service", Oct. 27, 2020, IETF, draft-dunbar-6man-5g-edge-compute-sticky-service-00, pp. 1-18 (Year: 2020).*

Nokia, "Using AF influence mechanism for V2X Application Server discovery", May 13-17, 2019, 3GPP TSG-SA WG2 Meeting #133, S2-1905390, pp. 1-2 (Year: 2019).*

(Continued)

*Primary Examiner* — Paul H. Masur
(74) *Attorney, Agent, or Firm* — Conley Rose, P.C.

(57) ABSTRACT

A method used by an egress router is disclosed. The egress router receives a first packet from an initial ingress router addressed to an anycast address of an application server. The egress router transmits the first packet to the application server. The egress router receives a second packet from the application server. The second packet is addressed to the initial ingress router. The egress router inserts a sticky destination sub type length value (Sticky-Dst-SubTLV) into a destination option header of the second packet. The egress router transmits the second packet with the Sticky-Dst-SubTLV to the ingress router.

20 Claims, 14 Drawing Sheets

(56) References Cited

OTHER PUBLICATIONS

Rajahalme, J., et al., "IPV6 Flow Label Specification," draft-ietf-ipv6-flow-label-02.txt, IPv6 Working Group, Internet Draft, Jun. 2002, 8 pages.

Dunbar Linda et al: "IPV6 Solution for 5G Edge Computing Sticky Service" draft-dunbar-6man-5g-edge-compute-sticky-service-01, IETF meeting 110, Mar. 8, 2021, pp. 1-11, XP093194822.

"3rd Generation Partnership Project; Technical Specification Group Services and System Aspects; Study on Enhancement of Support for Edge Computing in 5G Core Network (5GC) (Release 17)", 3GPP Draft: 23748-050, 3rd Generation Partnership Project (3GPP), Sep. 10, 2020 (Sep. 10, 2020), XP051934505, Retrieved from the Internet: URL: https: //ftp.3gpp.org/tsg_sa_WG2_Arch_/Latest_SA2_Specs/Latest_draft_S2_Specs/23748-050.zip draft23748-050-rm v2.docx.

Deering, et al., Internet Protocol, Version 6 (IPv6) Specification, RFC 8200, Jul. 2017, 42 pages.

Johnson, et al., "The Dynamic Source Routing Protocol for Mobile Ad Hoc Networks," Internet Citation, Nov. 17, 2000, (Nov. 17, 2000), XP002231891, Retrieved from the Internet: URL: http://www.ietf.org/proceedings/00dec/I-D/draft-ietf-manet-dsr-04.txt.

\* cited by examiner

NETWORK LAYER SUPPORT FOR 5G EDGE COMPUTING STICKY SERVICES

CROSS-REFERENCE TO RELATED APPLICATIONS

This patent application is a continuation of International Application No. PCT/US2021/056008 filed Oct. 21, 2021 by Linda Dunbar, et al., and titled "Network Layer Support For 5G Edge Computing Sticky Services," which claims the benefit of U.S. Provisional Patent Application No. 63/104,293 filed Oct. 22, 2020 by Linda Dunbar, et al., and titled "Network Layer Support For 5G Edge Computing Sticky Services," and U.S. Provisional Patent Application No. 63/125,187 filed Dec. 14, 2020 by Linda Dunbar, et al., and titled "Network Layer Methods to ANYCAST Sticky Services," which are hereby incorporated by reference.

TECHNICAL FIELD

The present disclosure is generally related to telecommunications, and is specifically related to a mechanism consistently route flows between a mobile device moving between fifth-generation mobile network (5G) sites and an application server in a data center communicatively connected to the 5G network via an Internet Protocol (IP) network.

BACKGROUND

Many modern mobile devices include equipment to support wireless internet connections. For example, the mobile devices can communicate via interfaces that are standardized by the 3rd Generation Partnership Project (3GPP). The most recent iteration of the mobile network is known as fifth generation mobile network (5G). Mobile networks are configured to allow a mobile device to move between locations by allowing the mobile device to swap connections between mobile network towers. In general, such movements can be accomplished without affecting connectivity. However, in some cases certain types of wireless communications can experience connectivity issues when the mobile device moves between mobile network towers.

SUMMARY

In an embodiment, the disclosure includes a method implemented by a user equipment (UE), the method comprising: transmitting, by the UE, a first packet addressed to an anycast address of a server, the first packet associated with a flow of a sticky service; receiving, by the UE from the server, a second packet of the flow comprising an Internet Protocol extension header with a sticky destination sub type length value (Sticky-Dst-SubTLV), the Sticky-Dst-SubTLV comprising an address of an egress router attached to the server; copying, by the UE, the Sticky-Dst-SubTLV into IP extension header of a third packet of the flow; and transmitting, by the UE, the third packet with the Sticky-Dst-SubTLV.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address, which can be a unicast IP address. The UE can use the anycast address as a destination address in communications, and the network can use the anycast address to route the communication to whichever application server is closest. This is in contrast to an IP address that points to a specific machine on the Internet. One problem with this approach is certain services may experience latency when swapping between instances. For example, a service that supports autonomous driving may need to resend data when swapping between instances, which may cause undesirable and/or dangerous latency. Services that desire to retain a communication flow between a UE and a specific application server even when the UE moves between mobile network sites or wireless communication network sites (e.g. 5G network sites) are referred to herein as sticky services.

The present embodiment includes mechanisms to support sticky services that connect to edge computing application servers sharing the same anycast address for different instances in different data centers. The disclosed mechanisms operate on ingress routers and egress routers. In one example, sticky services can be managed by relying on functionality at the UE. The UE sends a packet to the application server that is part of a flow. The packet is forwarded to the application server via an initial ingress router and the egress router. The application server sends a responsive packet to the UE via the egress router. The egress router is preconfigured to identify the anycast address as being associated with a sticky service. For example, an Edge Computing (EC) sticky services management system can configure various routers in the network with anycast addresses and/or sticky service identifiers (IDs) for sticky services. The egress router inserts a sticky destination sub type length value (Sticky-Dst-SubTLV) into a header of the responsive packet. The packet includes an additional Destination Address field containing destination address for forwarding the packet. The header may be a destination option(s) header (or called destination extension header), for example an IPv6 destination options header defined by IPv6 protocol. The Sticky-Dst-SubTLV contains the IP address of the egress router. The egress router then forwards the packet toward the UE via the initial ingress router. The UE copies the Sticky-Dst-SubTLV into subsequent packets belonging to the flow. In other words, the UE extracts the Sticky-Dst-SubTLV and inserts the extracted Sticky-Dst-SubTLV into subsequent packets belonging to the flow. The UE may extract the Sticky-Dst-SubTLV from every received packet of a flow such that the UE can insert it to the next packet of the same flow. The UE may store the extracted Sticky-Dst-SubTLV for sending subsequent packets belonging to the same flow. The action for storing the extracted Sticky-Dst-SubTLV may not be required for every packet received from the server and may be performed when the UE receives the packet in response to the first packet sent by the UE or when the UE receives an updated egress router address specified in a Sticky-Dst-SubTLV. When the UE moves between 5G sites, the subsequent ingress router forwards subsequent packets to the correct egress router by using the egress router address in the Sticky-Dst-SubTLV. For example, the subsequent ingress router can establish an IP tunnel with the egress router by using the egress router address. All packets sent by the UE to the server may include the UE's address as source address specified in the fixed header and the server's address (e.g. anycast address) as destination address specified in the fixed header. Correspondingly, all packets sent by the server to the UE may include the UE's address as destination address specified in the fixed header and the server's address (e.g. anycast address) as source address specified in the fixed header.

Optionally, in any of the preceding aspects, another implementation of the aspect provides, wherein the IP extension header of the second packet is an Internet Protocol version six (IPv6) destination options header, and wherein the Sticky-Dst-SubTLV is included in the IPv6 destination options header.

Optionally, in any of the preceding aspects, another implementation of the aspect provides, wherein the first packet, the second packet and the third packet are transmitted by the UE to a first Protocol Data Unit (PDU) session anchor (PSA) in a first mobile network site, the method further comprising: copying, by the UE, the Sticky-Dst-SubTLV into an IP extension header of a fourth packet of the flow; and transmitting, by the UE to a second PSA in a second mobile network site, the fourth packet with the Sticky-Dst-SubTLV for delivering the fourth packet to the server via the egress router specified in the Sticky-Dst-SubTLV.

Optionally, in any of the preceding aspects, another implementation of the aspect provides, wherein the Sticky-Dst-SubTLV comprises a sticky type.

Optionally, in any of the preceding aspects, another implementation of the aspect provides, wherein the Sticky-Dst-SubTLV comprises a flow label.

In an embodiment, the disclosure includes a method implemented by an ingress router, the method comprising: receiving, by the ingress router from a user equipment (UE), a first packet addressed to an anycast address of a server, the first packet associated with a flow of a sticky service and comprising an Internet Protocol extension header with a sticky destination sub type length value (Sticky-Dst-SubTLV), the Sticky-Dst-SubTLV comprising an address of an egress router; determining, by the ingress router, that a destination of the first packet matches with an access control list (ACL) of sticky services; and transmitting, by the ingress router, the first packet in accordance with the Sticky-Dst-SubTLV extracted from the first packet.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address, which can be a unicast IP address. The UE can use the anycast address as a destination address in communications, and the network can use the anycast address to route the communication to whichever application server is closest. This is in contrast to an IP address that points to a specific machine on the Internet. One problem with this approach is certain services may experience latency when swapping between instances. For example, a service that supports autonomous driving may need to resend data when swapping between instances, which may cause undesirable and/or dangerous latency. Services that desire to retain a communication flow between a UE and a specific application server even when the UE moves between mobile network sites or wireless communication network sites (e.g. 5G network sites) are referred to herein as sticky services.

The present embodiment includes mechanisms to support sticky services that connect to edge computing application servers sharing the same anycast address for different instances in different data centers. The disclosed mechanisms operate on ingress routers and egress routers. In one example, sticky services can be managed by relying on functionality at the UE. The UE sends a packet to the application server that is part of a flow. The packet is forwarded to the application server via an initial ingress router and the egress router. The application server sends a responsive packet to the UE via the egress router. The egress router is preconfigured to identify the anycast address as being associated with a sticky service. For example, an Edge Computing (EC) sticky services management system can configure various routers in the network with anycast addresses and/or sticky service identifiers (IDs) for sticky services. The egress router inserts a sticky destination sub type length value (Sticky-Dst-SubTLV) into a header of the responsive packet. The packet includes an additional Destination Address field containing destination address for forwarding the packet. The header may be a destination option(s) header (or called destination extension header), for example an IPv6 destination options header defined by IPv6 protocol. The Sticky-Dst-SubTLV contains the IP address of the egress router. The egress router then forwards the packet toward the UE via the initial ingress router. The UE copies the Sticky-Dst-SubTLV into subsequent packets belonging to the flow. In other words, the UE extracts the Sticky-Dst-SubTLV and inserts the extracted Sticky-Dst-SubTLV into subsequent packets belonging to the flow. The UE may extract the Sticky-Dst-SubTLV from every received packet of a flow such that the UE can insert it to the next packet of the same flow. The UE may store the extracted Sticky-Dst-SubTLV for sending subsequent packets belonging to the same flow. The action for storing the extracted Sticky-Dst-SubTLV may not be required for every packet received from the server and may be performed when the UE receives the packet in response to the first packet sent by the UE or when the UE receives an updated egress router address specified in a Sticky-Dst-SubTLV. When the UE moves between 5G sites, the subsequent ingress router forwards subsequent packets to the correct egress router by using the egress router address in the Sticky-Dst-SubTLV. For example, the subsequent ingress router can establish an IP tunnel with the egress router by using the egress router address. All packets sent by the UE to the server may include the UE's address as source address specified in the fixed header and the server's address (e.g. anycast address) as destination address specified in the fixed header. Correspondingly, all packets sent by the server to the UE may include the UE's address as destination address specified in the fixed header and the server's address (e.g. anycast address) as source address specified in the fixed header.

Optionally, in any of the preceding aspects, another implementation of the aspect provides, wherein the Sticky-Dst-SubTLV comprises a sticky type.

Optionally, in any of the preceding aspects, another implementation of the aspect provides, wherein the IP extension header of the second packet is an Internet Protocol version six (IPv6) destination options header, and wherein the Sticky-Dst-SubTLV is inserted into the IPv6 destination options header.

Optionally, in any of the preceding aspects, another implementation of the aspect provides, before transmitting the first packet, the method further comprising: encapsulating, by the ingress router, the first packet in a tunnel whose outer destination address is set to the egress address extracted from the Sticky-Dst-SubTLV.

Optionally, in any of the preceding aspects, another implementation of the aspect provides, further comprising: transmitting, by the ingress router, a sticky service table entry to neighboring ingress routers within a neighboring ingress group to support routing subsequent packets to the server upon movement of the UE between mobile network sites, the sticky service table entry comprising the address of the egress router.

In an embodiment, the disclosure includes a method implemented by a server, the method comprising: receiving, by the server from a user equipment (UE) via a data network, a first packet comprising an anycast address of the server and associated with a flow of a sticky service; inserting, by the server, a sticky destination sub type length value (Sticky-Dst-SubTLV) into an Internet Protocol extension header of a second packet of the flow, the Sticky-Dst-SubTLV comprising an address of an egress router attached to the server; and transmitting, by the server to the UE through the data network, the second packet with the Sticky-Dst-SubTLV.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address, which can be a unicast IP address. The UE can use the anycast address as a destination address in communications, and the network can use the anycast address to route the communication to whichever application server is closest. This is in contrast to an IP address that points to a specific machine on the Internet. One problem with this approach is certain services may experience latency when swapping between instances. For example, a service that supports autonomous driving may need to resend data when swapping between instances, which may cause undesirable and/or dangerous latency. Services that desire to retain a communication flow between a UE and a specific application server even when the UE moves between mobile network sites or wireless communication network sites (e.g. 5G network sites) are referred to herein as sticky services.

The present embodiment includes mechanisms to support sticky services that connect to edge computing application servers sharing the same anycast address for different instances in different data centers. The disclosed mechanisms operate on ingress routers and egress routers. In one example, sticky services can be managed by relying on functionality at the UE. The UE sends a packet to the application server that is part of a flow. The packet is forwarded to the application server via an initial ingress router and the egress router. The application server sends a responsive packet to the UE via the egress router. The egress router is preconfigured to identify the anycast address as being associated with a sticky service. For example, an Edge Computing (EC) sticky services management system can configure various routers in the network with anycast addresses and/or sticky service identifiers (IDs) for sticky services. The egress router inserts a sticky destination sub type length value (Sticky-Dst-SubTLV) into a header of the responsive packet. The packet includes an additional Destination Address field containing destination address for forwarding the packet. The header may be a destination option(s) header (or called destination extension header), for example an IPv6 destination options header defined by IPv6 protocol. The Sticky-Dst-SubTLV contains the IP address of the egress router. The egress router then forwards the packet toward the UE via the initial ingress router. The UE copies the Sticky-Dst-SubTLV into subsequent packets belonging to the flow. In other words, the UE extracts the Sticky-Dst-SubTLV and inserts the extracted Sticky-Dst-SubTLV into subsequent packets belonging to the flow. The UE may extract the Sticky-Dst-SubTLV from every received packet of a flow such that the UE can insert it to the next packet of the same flow. The UE may store the extracted Sticky-Dst-SubTLV for sending subsequent packets belonging to the same flow. The action for storing the extracted Sticky-Dst-SubTLV may not be required for every packet received from the server and may be performed when the UE receives the packet in response to the first packet sent by the UE or when the UE receives an updated egress router address specified in a Sticky-Dst-SubTLV. When the UE moves between 5G sites, the subsequent ingress router forwards subsequent packets to the correct egress router by using the egress router address in the Sticky-Dst-SubTLV. For example, the subsequent ingress router can establish an IP tunnel with the egress router by using the egress router address. All packets sent by the UE to the server may include the UE's address as source address specified in the fixed header and the server's address (e.g. anycast address) as destination address specified in the fixed header. Correspondingly, all packets sent by the server to the UE may include the UE's address as destination address specified in the fixed header and the server's address (e.g. anycast address) as source address specified in the fixed header.

Optionally, in any of the preceding aspects, another implementation of the aspect provides, wherein the Sticky-Dst-SubTLV comprises a sticky type.

Optionally, in any of the preceding aspects, another implementation of the aspect provides, wherein the IP extension header of the second packet is an Internet Protocol version six (IPv6) destination options header, and wherein the Sticky-Dst-SubTLV is inserted into the IPv6 destination options header.

Optionally, in any of the preceding aspects, another implementation of the aspect provides, before transmitting the first packet, the method further comprising: encapsulating, by an ingress router, the first packet in a tunnel whose outer destination address is set to the egress address extracted from the Sticky-Dst-SubTLV.

In an embodiment, the disclosure includes a method implemented by an egress router, the method comprising: receiving, by the egress router from a user equipment (UE) via a first ingress router, a first packet addressed to an anycast address of a server, the first packet associated with a flow of a sticky service; transmitting, by the egress router, the first packet to the server; receiving, by the egress router, a second packet of the flow from the server, the second packet addressed to the UE; inserting, by the egress router, a sticky destination sub type length value (Sticky-Dst-SubTLV) into an Internet Protocol extension header of the second packet, the Sticky-Dst-SubTLV comprising an address of the egress router; and transmitting, by the egress router, the second packet with the Sticky-Dst-SubTLV to the first ingress router.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address, which can be a unicast IP address. The UE can use the anycast address as a destination address in communications, and the network can use the anycast address to route the communication to whichever application server is closest. This is in contrast to an IP address that points to a specific machine on the Internet. One problem with this approach is certain services may experience latency when swapping between instances. For example, a service that supports autonomous driving may need to resend data when swapping between instances, which may cause undesirable and/or dangerous latency. Services that desire to retain a communication flow between a UE and a specific application server even when the UE moves between mobile network sites or wireless communication network sites (e.g. 5G network sites) are referred to herein as sticky services.

The present embodiment includes a mechanism for use when the network cannot rely on the UE to support sticky services. In such a case, various routers in the network can be preconfigured with anycast addresses and/or sticky service IDs for sticky services, for example based on communications with an EC sticky services management system. The UE sends a packet to the application server that is part of a flow. The initial ingress router receives the packet and determines the lowest cost application server and determines the corresponding egress router. In this example, the initial ingress router maintains a sticky service table. The initial ingress router reads the anycast address and determines the anycast address is associated with a sticky service. The initial ingress router then stores the anycast address and/or a sticky service ID, data indicating the flow (e.g., flow label and/or address of the UE), and the egress address of the egress router in an entry in the sticky service table. The initial ingress router then forwards the packet and any subsequent flow packets to the application server via the egress router based on the sticky service table entry. Such forwarding may be accomplished via an IP tunnel. In this example, the initial ingress router is responsible for forwarding the sticky service table entry to other ingress routers so that sticky services can be maintained in the event of a UE handover. In one example, a 5G EC management system notifies the initial ingress router when the UE experiences a handover to a final 5G site. In such a case, the initial ingress router determines the final ingress router associated with the final 5G site and sends the sticky service table entry to the final ingress router, for example in a Sticky-Dst-SubTLV. In another example, the ingress router does not receive notifications from the 5G network. In such a case, the initial ingress router periodically advertises the sticky service table to a group of neighboring ingress routers. In either case, the final ingress router receives the sticky service table entry from the initial ingress router. Accordingly, when the UE moves between 5G sites, the final ingress router forwards subsequent packets to the correct egress router by using the egress router address in the sticky service table entry corresponding to the anycast address and flow label/UE address. For example, the final ingress router can establish an IP tunnel with the egress router by using the egress router address.

Optionally, in any of the preceding aspects, another implementation of the aspect provides, wherein the IP extension header of the second packet is an Internet Protocol version six (IPv6) destination options header, and wherein the Sticky-Dst-SubTLV is inserted into the IPv6 destination options header.

Optionally, in any of the preceding aspects, another implementation of the aspect provides, wherein the Sticky-Dst-SubTLV comprises a sticky type.

Optionally, in any of the preceding aspects, another implementation of the aspect provides, wherein the first ingress router is coupled to a first Protocol Data Unit (PDU) session anchor (PSA) in a first mobile network site, and wherein the first packet is received from the first ingress router while traffic from the UE is anchored by the first PSA at the first mobile network site.

Optionally, in any of the preceding aspects, another implementation of the aspect provides, further comprising: receiving, by the egress router, a third packet of the flow from a second ingress router, wherein the third packet is addressed to the anycast address of the server and comprises the Sticky-Dst-SubTLV; and transmitting, by the egress router, the third packet to the server.

Optionally, in any of the preceding aspects, another implementation of the aspect provides, wherein the second ingress router is coupled to a second PSA in a second mobile network site, and wherein the third packet is received from the second ingress router while traffic from the UE is anchored to the second PSA at the second mobile network site.

In an embodiment, the disclosure includes a method implemented by an ingress router, the method comprising: receiving, by the ingress router from a user equipment (UE), a first packet addressed to an anycast address of a server, wherein the first packet contains data indicating a flow of a sticky service associated with the first packet; determining, by the ingress router, that the anycast address is associated with a sticky service identifier (ID); determining, by the ingress router, an egress address of an egress router for forwarding the first packet; storing, by the ingress router, the data indicating the flow, the sticky service ID, and the egress address in an entry in a sticky service table; transmitting, by the ingress router, the first packet to the egress router; receiving, by the ingress router, a second packet containing the anycast address and the data indicating the flow; and transmitting, by the ingress router, the second packet to the egress router based on a correspondence between the sticky service ID, the flow label, and the egress address in the sticky service table.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address, which can be a unicast IP address. The UE can use the anycast address as a destination address in communications, and the network can use the anycast address to route the communication to whichever application server is closest. This is in contrast to an IP address that points to a specific machine on the Internet. One problem with this approach is certain services may experience latency when swapping between instances. For example, a service that supports autonomous driving may need to resend data when swapping between instances, which may cause undesirable and/or dangerous latency. Services that desire to retain a communication flow between a UE and a specific application server even when the UE moves between mobile network sites or wireless communication network sites (e.g. 5G network sites) are referred to herein as sticky services.

The present embodiment includes a mechanism for use when the network cannot rely on the UE to support sticky services. In such a case, various routers in the network can be preconfigured with anycast addresses and/or sticky service IDs for sticky services, for example based on communications with an EC sticky services management system. The UE sends a packet to the application server that is part of a flow. The initial ingress router receives the packet and determines the lowest cost application server and determines the corresponding egress router. In this example, the initial ingress router maintains a sticky service table. The initial ingress router reads the anycast address and determines the anycast address is associated with a sticky service. The initial ingress router then stores the anycast address and/or a sticky service ID, data indicating the flow (e.g., flow label and/or address of the UE), and the egress address of the egress router in an entry in the sticky service table. The initial ingress router then forwards the packet and any subsequent flow packets to the application server via the egress router based on the sticky service table entry. Such forwarding may be accomplished via an IP tunnel. In this example, the initial ingress router is responsible for forwarding the sticky service table entry to other ingress routers so that sticky services can be maintained in the event of a UE handover. In one example, a 5G EC management system notifies the initial ingress router when the UE experiences a handover to a final 5G site. In such a case, the initial ingress router determines the final ingress router associated with the final 5G site and sends the sticky service table entry to the final ingress router, for example in a Sticky-Dst-SubTLV. In another example, the ingress router does not receive notifications from the 5G network. In such a case, the initial ingress router periodically advertises the sticky service table to a group of neighboring ingress routers. In either case, the final ingress router receives the sticky service table entry from the initial ingress router. Accordingly, when the UE moves between 5G sites, the final ingress router forwards subsequent packets to the correct egress router by using the egress router address in the sticky service table entry corresponding to the anycast address and flow label/UE address. For example, the final ingress router can establish an IP tunnel with the egress router by using the egress router address.

Optionally, in any of the preceding aspects, another implementation of the aspect provides, further comprising advertising, by the ingress router, the sticky service table to neighboring ingress routers within a neighboring ingress group to support routing subsequent packets to the server upon movement of the UE between fifth-generation mobile network (5G) sites.

Optionally, in any of the preceding aspects, another implementation of the aspect provides, wherein the data indicating the flow is a flow label.

Optionally, in any of the preceding aspects, another implementation of the aspect provides, further comprising: receiving, by the ingress router, a notification from a fifth-generation mobile network (5G) Edge Computing (EC) Management system, the notification indicating the UE has moved from an initial Protocol Data Unit (PDU) session anchor (PSA) at an initial fifth generation mobile network (5G) site to a subsequent PSA at a subsequent 5G site; and sending, by the ingress router, the entry in the sticky service table to a subsequent ingress router to support routing subsequent packets to the server.

Optionally, in any of the preceding aspects, another implementation of the aspect provides, wherein the entry in the sticky service table contains a timer, and further comprising removing, by the ingress router, the entry in the sticky service table when the timer expires.

Optionally, in any of the preceding aspects, another implementation of the aspect provides, wherein the sticky service identifier ID is the anycast address of the server.

Optionally, in any of the preceding aspects, another implementation of the aspect provides, further comprising receiving, by the receiver, a list of sticky service IDs for sticky services from a sticky services management system.

In an embodiment, the disclosure includes a method implemented by an Edge Computing (EC) sticky services management system, the method comprising: receiving, by the EC sticky services management system, a request to register an anycast address of an application server as associated with a sticky service; storing, by the EC sticky services management system, the anycast address of the application server in a list of sticky services; and transmitting, by the EC sticky services management system, a configuration message to add the anycast address of the application server stored in the list of sticky services to an access control list (ACL) for filtering traffic at an ingress router for sticky services.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address, which can be a unicast IP address. The UE can use the anycast address as a destination address in communications, and the network can use the anycast address to route the communication to whichever application server is closest. This is in contrast to an IP address that points to a specific machine on the Internet. One problem with this approach is certain services may experience latency when swapping between instances. For example, a service that supports autonomous driving may need to resend data when swapping between instances, which may cause undesirable and/or dangerous latency. Services that desire to retain a communication flow between a UE and a specific application server even when the UE moves between mobile network sites or wireless communication network sites (e.g. 5G network sites) are referred to herein as sticky services.

The present embodiment includes mechanisms to support sticky services that connect to edge computing application servers sharing the same anycast address for different instances in different data centers. The disclosed mechanisms operate on ingress routers and egress routers. In one example, sticky services can be managed by relying on functionality at the UE. The UE sends a packet to the application server that is part of a flow. The packet is forwarded to the application server via an initial ingress router and the egress router. The application server sends a responsive packet to the UE via the egress router. The egress router is preconfigured to identify the anycast address as being associated with a sticky service. For example, an Edge Computing (EC) sticky services management system can configure various routers in the network with anycast addresses and/or sticky service identifiers (IDs) for sticky services. The egress router inserts a sticky destination sub type length value (Sticky-Dst-SubTLV) into a header of the responsive packet. The packet includes an additional Destination Address field containing destination address for forwarding the packet. The header may be a destination option(s) header (or called destination extension header), for example an IPv6 destination options header defined by IPv6 protocol. The Sticky-Dst-SubTLV contains the IP address of the egress router. The egress router then forwards the packet toward the UE via the initial ingress router. The UE copies the Sticky-Dst-SubTLV into subsequent packets belonging to the flow. In other words, the UE extracts the Sticky-Dst-SubTLV and inserts the extracted Sticky-Dst-SubTLV into subsequent packets belonging to the flow. The UE may extract the Sticky-Dst-SubTLV from every received packet of a flow such that the UE can insert it to the next packet of the same flow. The UE may store the extracted Sticky-Dst-SubTLV for sending subsequent packets belonging to the same flow. The action for storing the extracted Sticky-Dst- SubTLV may not be required for every packet received from the server and may be performed when the UE receives the packet in response to the first packet sent by the UE or when the UE receives an updated egress router address specified in a Sticky-Dst-SubTLV. When the UE moves between 5G sites, the subsequent ingress router forwards subsequent packets to the correct egress router by using the egress router address in the Sticky-Dst-SubTLV. For example, the subsequent ingress router can establish an IP tunnel with the egress router by using the egress router address. All packets sent by the UE to the server may include the UE's address as source address specified in the fixed header and the server's address (e.g. anycast address) as destination address specified in the fixed header. Correspondingly, all packets sent by the server to the UE may include the UE's address as destination address specified in the fixed header and the server's address (e.g. anycast address) as source address specified in the fixed header.

Optionally, in any of the preceding aspects, another implementation of the aspect provides, wherein the anycast address of the application server is a sticky service identifier (ID) for flows addressed to the anycast address.

Optionally, in any of the preceding aspects, another implementation of the aspect provides, further comprising transmitting, by the EC sticky services management system, the configuration message to add the anycast address of the application server to an ACL for filtering traffic at an egress router for sticky services.

Optionally, in any of the preceding aspects, another implementation of the aspect provides, wherein the ingress router is coupled to a fifth generation mobile network (5G) site, and wherein the egress router is coupled to the application server.

In an embodiment, the disclosure includes a network element comprising: a non-transitory memory storage comprising instructions; and one or more processors in communication with the non-transitory memory storage, wherein the one or more processors execute the instructions to perform the method of any of the preceding aspects.

In an embodiment, the disclosure includes a non-transitory computer readable medium comprising a computer program product for use by a network element, the computer program product comprising computer executable instructions stored on the non-transitory computer readable medium such that when executed by a processor cause the network element to perform the method of any of the preceding aspects.

In an embodiment, the disclosure includes an egress router comprising: a non-transitory memory storage comprising instructions; and one or more processors in communication with the non-transitory memory storage, wherein the one or more processors execute the instructions to perform the method of any of the preceding aspects.

In an embodiment, the disclosure includes a user equipment (UE) comprising: a non-transitory memory storage comprising instructions; and one or more processors in communication with the non-transitory memory storage, wherein the one or more processors execute the instructions to perform the method of any of the preceding aspects.

In an embodiment, the disclosure includes an ingress router comprising: a non-transitory memory storage comprising instructions; and one or more processors in communication with the non-transitory memory storage, wherein the one or more processors execute the instructions to perform the method of any of the preceding aspects.

In an embodiment, the disclosure includes an ingress router comprising: a non-transitory memory storage comprising instructions; and one or more processors in communication with the non-transitory memory storage, wherein the one or more processors execute the instructions to perform the method of any of the preceding aspects.

In an embodiment, the disclosure includes an Edge Computing (EC) sticky services management system comprising: a non-transitory memory storage comprising instructions; and one or more processors in communication with the non-transitory memory storage, wherein the one or more processors execute the instructions to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
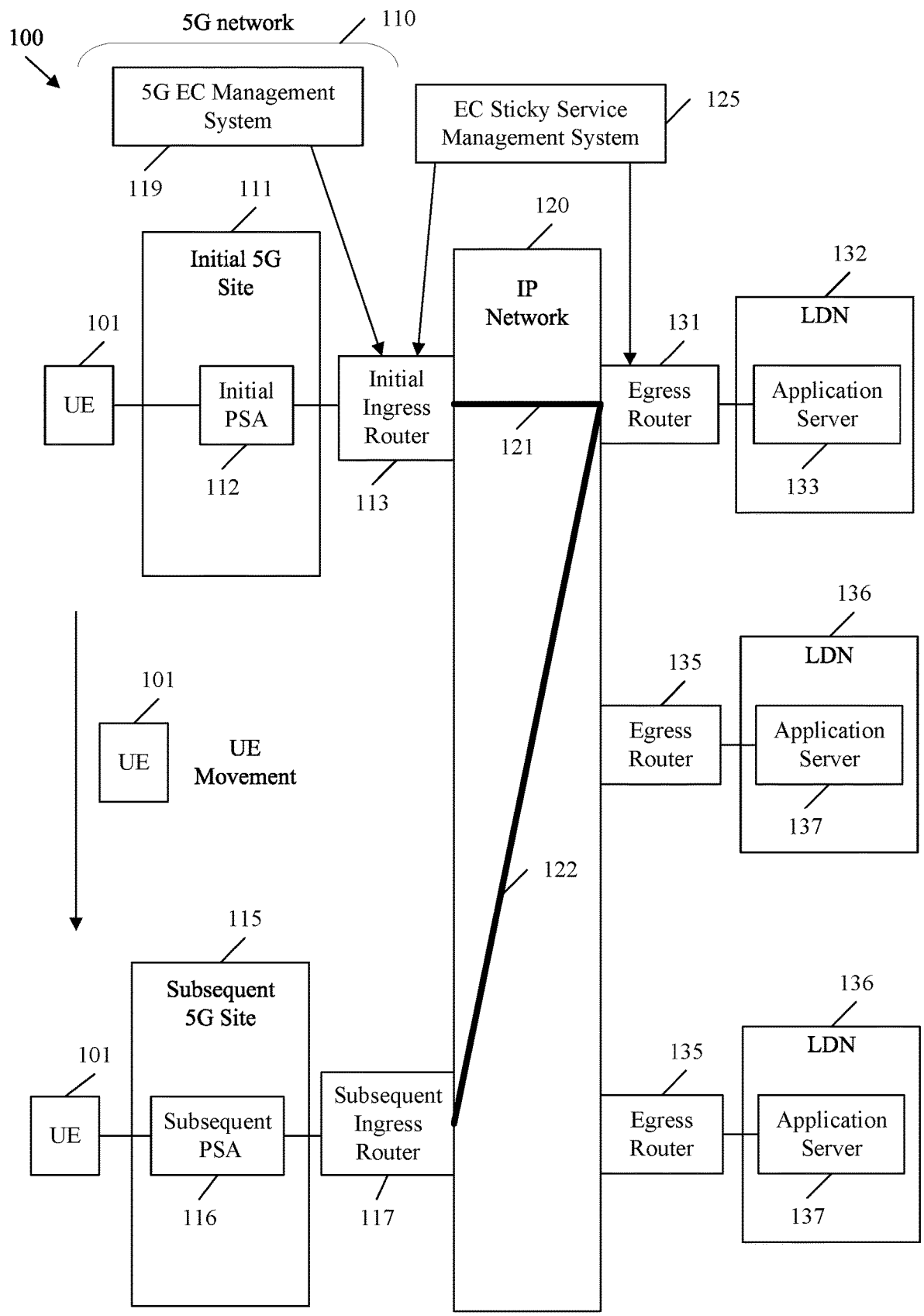
FIG. 1 is a schematic diagram of an example 5G edge computing network.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

A mobile device, referred to herein as a user equipment (UE), can take advantage of edge computing services. Specifically, the 5G network is communicatively connected to an IP network, which is communicatively connected to various data centers. Edge computing involves connecting application servers in a data center directly to the IP network. The goal of edge computing is to route communications from a UE connected to the 5G to the lowest cost application server via the IP network. Lowest cost may include a measurement of physical distance, of current network congestion, of current load on the application server, etc. By placing the application servers in close physical proximity to the 5G network, latency between the UE and the application server can be significantly reduced.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address, which can be a unicast IP address. The UE can use the anycast address as a destination address in communications, and the network can use the anycast address to route the communication to whichever application server is closest. This is in contrast to an IP address that points to a specific machine on the Internet. One problem with this approach is certain services may experience latency when swapping between instances. For example, a service that supports autonomous driving may need to resend data when swapping between instances, which may cause undesirable and/or dangerous latency. Services that desire to retain a communication flow between a UE and a specific application server even when the UE moves between mobile network sites or wireless communication network sites (e.g. 5G network sites) are referred to herein as sticky services. In the disclosure, the mobile network sites are not limited to 5G network sites, which can be beyond 5G network sites.

Disclosed herein are mechanisms to support sticky services that connect to edge computing application servers sharing the same anycast address for different instances in different data centers. The disclosed mechanisms operate on ingress routers and egress routers. As used herein, an ingress router is a router connecting the 5G network to the IP network, and an egress router is a router connecting the IP network to the data center containing the edge computing application server. It should be noted that the terms initial and subsequent are used herein to denote the difference between a 5G site/ingress router servicing a UE before and after a handover, respectively. In one example, sticky services can be managed by relying on functionality at the UE. The UE sends a packet to the application server that is part of a flow. The packet is forwarded to the application server via an initial ingress router and the egress router. The application server sends a responsive packet to the UE via the egress router. The egress router is preconfigured to identify the anycast address as being associated with a sticky service. For example, an Edge Computing (EC) sticky services management system can configure various routers in the network with anycast addresses and/or sticky service identifiers (IDs) for sticky services. The egress router inserts a sticky destination sub type length value (Sticky-Dst-SubTLV) into a header of the responsive packet. The packet includes an additional Destination Address field containing destination address for forwarding the packet. The header may be a destination option(s) header (or called destination extension header), for example an IPv6 destination options header defined by IPv6 protocol. The Sticky-Dst-SubTLV contains the IP address of the egress router. The egress router then forwards the packet toward the UE via the initial ingress router. The UE copies the Sticky-Dst-SubTLV into subsequent packets belonging to the flow. In other words, the UE extracts the Sticky-Dst-SubTLV and inserts the extracted Sticky-Dst-SubTLV into subsequent packets belonging to the flow. The UE may extract the Sticky-Dst-SubTLV from every received packet of a flow such that the UE can insert it to the next packet of the same flow. The UE may store the extracted Sticky-Dst-SubTLV for sending subsequent packets belonging to the same flow. The action for storing the extracted Sticky-Dst-SubTLV may not be required for every packet received from the server and may be performed when the UE receives the packet in response to the first packet sent by the UE or when the UE receives an updated egress router address specified in a Sticky-Dst-SubTLV. When the UE moves between 5G sites, the subsequent ingress router forwards subsequent packets to the correct egress router by using the egress router address in the Sticky-Dst-SubTLV. For example, the subsequent ingress router can establish an IP tunnel with the egress router by using the egress router address. All packets sent by the UE to the server may include the UE's address as source address specified in the fixed header and the server's address (e.g. anycast address) as destination address specified in the fixed header. Correspondingly, all packets sent by the server to the UE may include the UE's address as destination address specified in the fixed header 1600 and the server's address (e.g. anycast address) as source address specified in the fixed header 1600.

In another example, the network cannot rely on the UE to support sticky services. In such a case, various routers in the network can be preconfigured with anycast addresses and/or sticky service IDs for sticky services, for example based on communications with an EC sticky services management system. The UE sends a packet to the application server that is part of a flow. The initial ingress router receives the packet and determines the lowest cost application server and determines the corresponding egress router. In this example, the initial ingress router maintains a sticky service table. The initial ingress router reads the anycast address and determines the anycast address is associated with a sticky service. The initial ingress router then stores the anycast address and/or a sticky service ID, data indicating the flow (e.g., flow label and/or address of the UE), and the egress address of the egress router in an entry in the sticky service table. The initial ingress router then forwards the packet and any subsequent flow packets to the application server via the egress router based on the sticky service table entry. Such forwarding may be accomplished via an IP tunnel. In this example, the initial ingress router is responsible for forwarding the sticky service table entry to other ingress routers so that sticky services can be maintained in the event of a UE handover. In one example, a 5G EC management system notifies the initial ingress router when the UE experiences a handover to a final 5G site. In such a case, the initial ingress router determines the final ingress router associated with the final 5G site and sends the sticky service table entry to the final ingress router, for example in a Sticky-Dst-SubTLV. In another example, the ingress router does not receive notifications from the 5G network. In such a case, the initial ingress router periodically advertises the sticky service table to a group of neighboring ingress routers. In either case, the final ingress router receives the sticky service table entry from the initial ingress router. Accordingly, when the UE moves between 5G sites, the final ingress router forwards subsequent packets to the correct egress router by using the egress router address in the sticky service table entry corresponding to the anycast address and flow label/UE address. For example, the final ingress router can establish an IP tunnel with the egress router by using the egress router address.

FIG. 1 is a schematic diagram of an example 5G edge computing network 100. The network 100 includes a 5G network 110 and an IP network 120. A UE 101 can connect to the 5G network, which connects to the IP network 120. The IP network 120 can then connect to a local data network (LDN) 132 and/or an LDN 136 containing an application server 133 and/or an application server 137, respectively. In this way, the UE 101 can communicate with an application server 133 and/or 137 via the 5G network 110 and the IP network 120.

A UE 101 is any user device capable of communicating with a 5G network 110 over a wireless interface. A wide variety of UEs 101 include 5G communication capabilities, such as cell phones, tablets, computers, appliances, etc. The present disclosure focuses on UEs 101 that employ sticky services. A sticky service is any communication service designed to retain a communication flow between a UE 101 and a specific application server, such as application server 133, even when the UE 101 moves between 5G network 110 sites. For example, switching between application servers may require a UE 101 to resend certain data. This may be problematic for applications that include strict latency requirements. As a specific example, a UE 101 may be an autonomous vehicle that uses a wireless interface to communicate with an application operating at an application server 133 for driving purposes. As a specific example, swapping between an application server 133 and an application server 137 may impair the ability of an autonomous vehicle to perform a driving related action in a timely manner.

The UE 101 connects to the 5G network 110. The 5G network 110 includes various 5G sites including an initial 5G site 111 and a subsequent 5G site 115. The initial 5G site 111 and the subsequent 5G site 115 are substantially similar, but are positioned at different geographical locations. The terms initial and subsequent are employed for clarity of discussion to denote that the UE 101 is initially connected to the initial 5G site 111 before moving to a different location and connecting to the subsequent 5G site 115. The initial 5G site 111 and the subsequent 5G site 115 each contain a 3GPP compliant wireless communications device known as a gNodeB base station (gNB). The gNB (not shown) communicates wirelessly with the UE 101.

The initial 5G site 111 and the subsequent 5G site 115 also contain an initial Protocol Data Unit (PDU) session anchor (PSA) 112 and a subsequent PSA 116, respectively. An initial PSA 112 and subsequent PSA 116 are 5G components configured to act as session anchor points for mobility purposes in the initial 5G site 111 and the subsequent 5G site 115, respectively. As an example, a UE 101 can initially be anchored to an initial PSA 112 in the initial 5G site 111. The UE 101 can communicate packets to the initial PSA 112 via a gNB, and the initial PSA 112 can forward such packets toward the IP network 120. Further, devices communicating with the UE 101 can send packets to the initial PSA 112, and the initial PSA 112 can forward such packets to the UE 101. Later, the UE 101 can move to the subsequent 5G site 115, in which case the session anchor responsibility is handed over to the subsequent PSA 116. The subsequent PSA 116 can then forward packets back and forth between the UE 101 and the IP network 120. It should be noted that the 5G network 110 contains many other components that are not directly relevant to the current examples. Such components are omitted for clarity of discussion.

The IP network 120 is a group of interconnected network nodes that are addressable by IP addresses. An IP network 120 may include an IP version four (IPv4) network employing an IPv4 address space and/or an IP version six (IPv6) network employing a larger IPv6 address space. The IP network 120 includes many network nodes including an initial ingress router 113, a subsequent ingress router 117, an egress router 131, and egress router 135. The initial ingress router 113 and the subsequent ingress router 117 connect the initial 5G site 111 and the subsequent 5G site, respectively, to the IP network 120. Likewise, the egress router 131 and the egress routers 135 connect the LDN 132 and LDNs 136 to the IP network 120. The initial ingress router 113, subsequent ingress router 117, egress router 131, and egress router 135 are each configured to apply packet filters to flows and route packets according to IP addresses contained in headers of the packets. The initial ingress router 113, subsequent ingress router 117, egress router 131, and egress router 135 are also configured to encapsulate packets with additional headers to create IP tunnels, such as an IP tunnel 121 and an IP tunnel 122, across the IP network 120. An IP tunnel 121 and 122 is a path across a network between two points. Headers can be appended to the front of each packet in a flow of packets, which causes each packet to be routed along the path according to the headers resulting in an IP tunnel 121 and/or 122.

IP network 120 deploys IPv6 protocol to transmit and receive packets (i.e. IPv6 packets). An IPv6 packet has an IPv6 header which includes a fixed header and one or more extension headers (if applicable). An extension headers, also called optional header or options header, carries optional internet layer information and is placed between the fixed header and the upper-layer protocol header. The upper-layer protocol header is in an upper-layer protocol unit. Extension headers form a chain, using the Next Header fields. The Next Header field in the fixed header indicates the type of the first extension header; the Next Header field of the last extension header indicates the type of the upper-layer protocol header in the payload of the packet. All extension headers are a multiple of 8 octets in size; some extension headers require internal padding to meet this requirement.

Figure 16:
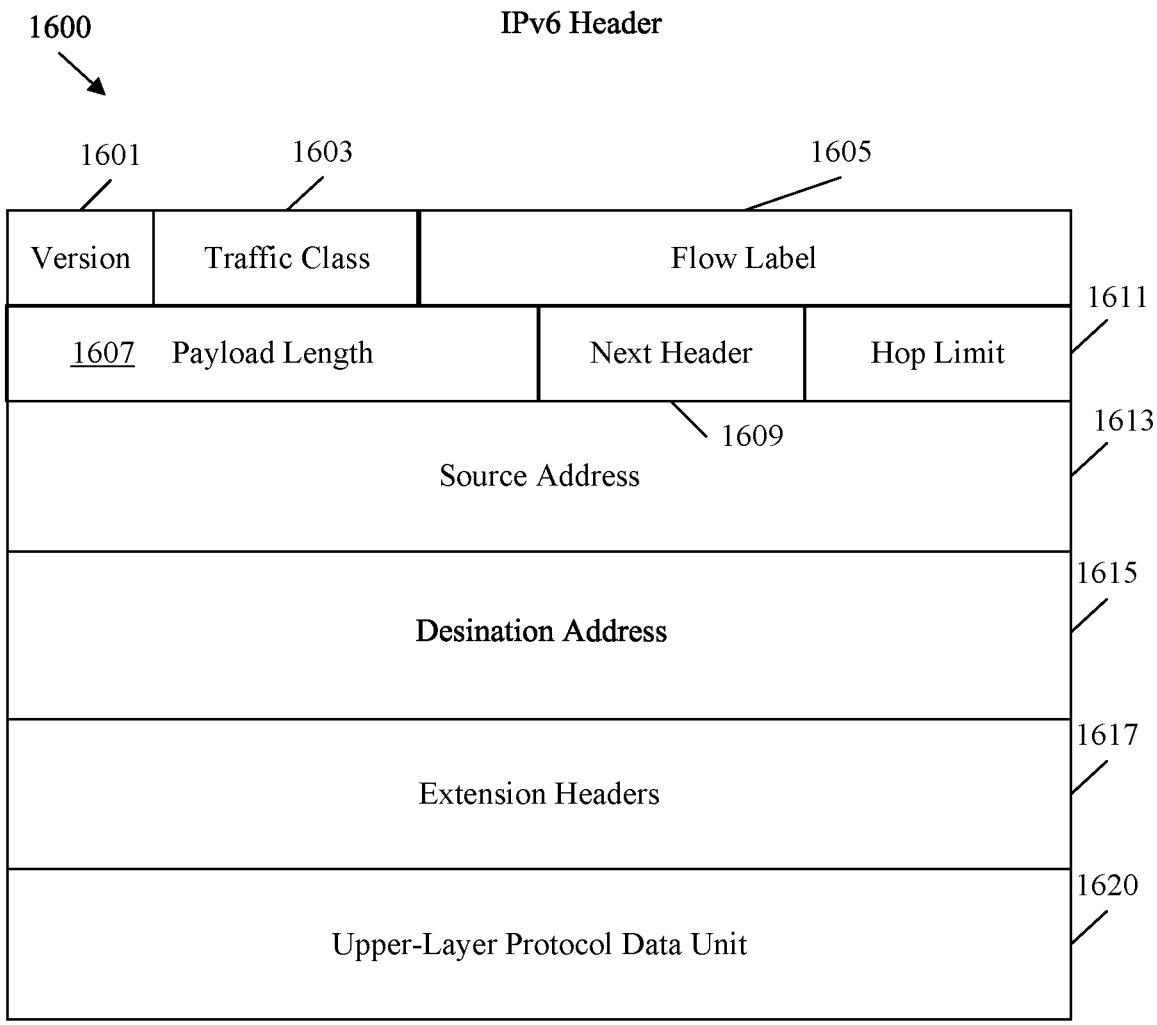
FIG. 16 is an example IPv6 packet format.

Reference is made to FIG. 16, which is an example IPv6 packet format that can be used by an IPv6 protocol in an IP network 120. The IPv6 packet includes an IPv6 fixed header 1600 which includes a version field 1601, a traffic class field 1603, a flow label field 1605, a length field 1607, a next header field 1609, a hop limit field 1611, a source address field 1613 and a destination address field 1615. The version field 1601 is set to a value of six to indicate the IPv6 version. The traffic class field 1603 may be eight bits long and may extend from bit position four to bit position eleven. The traffic class field 1603 may is used for network traffic management, and can be set to indicate a traffic class associated with the flow to which the packet belongs. The flow label field 1605 may be twenty bits long and may extend from bit position twelve to bit position thirty-one. The flow label field 1605 can be set by a source to label a sequence of packets to be treated in the network as a single flow. The payload length field 1607 may be sixteen bits long and may extend from bit position zero to bit position fifteen. The length field 1607 indicates the size of the payload in octets, including any extension headers. The length is set to zero when a Hop-by-Hop extension header carries a Jumbo Payload option. The next header field 1609 may be eight bits long and may extend from bit position sixteen to bit position twenty-three. The next header field 1609 specifies the type of the next header, which usually specifies the transport layer protocol used by a packet's payload. The hop limit field 1611 may be eight bits long and may extend from bit position twenty-three to bit position thirty-one. The hop limit field 1611 can be set to a value indicating the maximum number of hop the packet is allowed to traverse. The value of the hop limit field 1611 can be decremented by one by each node that forwards the packet. Any node other than the destination node may discard the packet when the value in the hop limit field 1611 is decremented to zero. However, the destination node should process the packet normally even if received with a hop limit of 0. The source address field 1613 and a destination address field 1615, which each may be one hundred twenty-eight bits long and may extend from bit position zero to bit position thirty-one over successive sets of octets. The source address field 1613 can be set to the address of the originator of the packet, and the destination address field 1615 can be set to the address of the intended recipient of the packet.

In FIG. 16, the IPv6 packet includes extension field 1617 which is an optional field and may be used to carry one or more extension headers, for example destination options header, routing extension header and etc. The IPv6 packet includes an upper-layer protocol data unit 1620 to carry data, which includes additional upper-layer protocol header.

Returning to FIG. 1, an LDN 132 and LDNs 136 are networks configured to connect computational components, such as servers, to the IP network 120. For example, LDNs 132 and 136 may each be housed in a data center. An application server 133 and application servers 137 are computational components located in LDN 132 and LDNs 136, respectively. For example, application server 133 and application servers 137 may host applications that can be accessed by other components, such as UE 101. In an edge computing system, the application servers 133 and 137 may be directly connected to the corresponding egress routers 131 and 135 to support the lowest possible latency. In an example, the application server 133 and application servers 137 each deploy different instances of the same application. Each instance may respond to input data in substantially the same manner, but each instance may receive different input data. Further, the application server 133 and application servers 137 may all be assigned the same anycast address. An anycast address is a single destination IP address shared by multiple devices. Since the application server 133 and application servers 137 are located in different LDNs 132 and 136, the application servers 133 and 137 are all positioned in different locations. Since the application servers 133 and 137 all have the same anycast address, communications from UE 101 can be routed to whichever application server 133 and/or 137 is physically closest to the UE 101. As such, the UE 101 can employ the anycast address to communicate with whichever application server 133 and/or 137 is located closest to whichever 5G site is currently connected to the UE 101. For example, anycast routing can use routing costs that consider a number of hops and/or network congestion to load balance communications.

Using anycast addresses in this manner has the advantage of reducing latency by ensuring the UE 101 is always communicating with the lowest cost application server 133 and/or 137. However, in some instances the UE 101 may employ sticky services, and hence the UE 101 may wish to continue communicating with the same application server even when the UE 101 moves to a different 5G site. As an example, the UE 101 may initially connect to the initial PSA 112 in the initial 5G site 111. The UE 101 may send a packet requesting service from an application instance by setting the destination address to the anycast address for the application. The initial PSA 112 forwards the packet to the initial ingress router 113, which is directly connected to the initial 5G site 111. The initial ingress router 113 reviews the anycast address and determines that the lowest cost instance associated with the anycast address is connected to the egress router 131. So the initial ingress router 113 forwards the packet to the egress router 131 via the IP tunnel 121. The egress router 131 can then forward the packet to the application server 133 in the LDN 132. The application server 133 can then communicate with the UE 101 at the initial 5G site 111 via the egress router 131, IP tunnel 121, initial ingress router 113, and initial PSA 112.

At a later time, the UE 101 can move to the subsequent PSA 116 at the subsequent 5G site 115. The UE 101 may continue sending packets to the anycast address. In this case, the subsequent PSA 116 may forward the packet to the subsequent ingress router 117. The default behavior for the subsequent ingress router 117 may be to determine the lowest cost instance associated with the anycast address, which may cause the subsequent ingress router 117 to forward the packet to an application server 137 via an egress router 135. Since the application server 137 is a different instance than the application server 133, the application server 137 may mishandle the packet as the application server 137 may not be aware of the session and/or flow associated to the packet. The present disclosure relates to mechanisms to implement sticky services to cause a flow to continue to route to the same application server after a UE 101 move. In this example, sticky services should cause the subsequent ingress router 117 to continue to route anycast packets from the UE 101 to the application server 133 connected or attached to the egress router 131 even when the egress router 135 and application server 137 may be associated with lower routing costs.

The present embodiments may include an edge computing (EC) sticky services management system 125 in the IP network 120, which is a computational component configured to manage sticky services. For example, the EC sticky services management system 125 may receive a registration request from an application, or an administrator thereof, that employs sticky services. The EC sticky services management system 125 may maintain a list of the sticky services and corresponding anycast addresses. For example, the EC sticky services management system 125 may maintain a list of anycast addresses as sticky service identifiers (IDs) for the corresponding applications. A sticky service ID may be an anycast address of a sticky service or other value that denotes a sticky service. The EC sticky services management system 125 can then configure an access control list (ACL) at the initial ingress router 113, the subsequent ingress router 117, the egress router 131, and/or egress routers 135 with the anycast addresses and/or sticky service IDs. Accordingly, the routers 113, 117, 131, and 135 can use the ACL to filter packets by anycast address to locate packets that should be treated as part of sticky services. The ACL may include the sticky service IDs for filtering the packets. The details of the ACL can be referred to in the description included in this disclosure.

Once the routers 113, 117, 131, and 135 are configured for sticky services, various mechanisms may be employed to implement the sticky service functionality. In one example, the network 100 can rely on the UE 101 to assist with sticky service routing. In this embodiment, the UE 101 forwards a first packet upstream to the initial PSA 112. The first packet may be part of a flow. The packet is then forwarded to the initial ingress router 113. The initial ingress router 113 forwards the first packet to the lowest cost egress router 131, which forwards the first packet to the application server 133. The application server 133 then responds with a second packet sent downstream via the egress router 131. The egress router 131 recognizes the second packet has a source address equal to the sticky service anycast address of the application server 133. The egress router 131 then appends the IP address of the egress router to the second packet. For example, the IP address of the egress router can be included in a sticky destination sub type length value (Sticky-Dst-SubTLV). The Sticky-Dst-SubTLV can then be included in a packet header for the second packet, such as an IPv6 destination options header or called IPv6 destination extension header. In IPv6, optional internet-layer information is encoded in separate headers that may be placed between the IPv6 fixed header and the upper-layer header in a packet. Extension headers (except for the Hop-by-Hop Options header) are not processed, inserted, or deleted by any node or router along a packet's delivery path, until the packet reaches the node (or each of the set of nodes, in the case of multicast) identified in the Destination Address field of the IPv6 header. The second packet can then be forwarded toward the UE 101. The UE 101 can be configured to copy the packet header from each downstream packet into subsequent upstream packets that are part of the same flow. As such, the initial ingress router 113 receives further upstream packets at the initial 5G site 111, extracts the packet header with the Sticky-Dst-SubTLV, and determines whether the packet matches the ACL. If the flow exists in the Sticky-Dst-SubTLV, the ingress router 113 can extract the flow label and the egress router address (or identifier) from the Sticky-Dst-SubTLV. The initial ingress router 113 may determine if the extracted flow label matches with a flow label in the IPv6 fixed header for further packet forwarding. The initial ingress router 113 can then forward the upstream packets to the egress router 131 based on the IP address of the egress router 131 in the header instead of determining the lowest cost destination for the anycast address. Further, the UE 101 can move to the subsequent 5G site 115. The header from the downstream packets continue to contain the Sticky-Dst-SubTLV with the IP address of the egress router 131. Hence, the UE 101 can copy the header with the IP address of the egress router 131 into upstream packets sent to the subsequent PSA 116. The packets are forwarded to the subsequent ingress router 117, which recognizes the packets as sticky service packets based on the ACL. The subsequent ingress router 117 can then forward the upstream packets to the egress router 131, for example via IP tunnel 122, based on the IP address of the egress router 131 in the header instead of determining the lowest cost destination for the anycast address. In this way, the anycast packets from the UE 101 continue to stick to the application server 133 even when the UE 101 physically moves away from the initial 5G site 111.

In another example, the network 100 cannot rely on the UE 101 to assist with sticky service routing. In such a case, the initial ingress router 113 can be employed to manage sticky services. The initial ingress router 113 may recognize packets from the UE 101 as sticky services based on the anycast address. The initial ingress router 113 can maintain a sticky service table. The initial ingress router 113 can determine the lowest cost egress router 131 when a sticky services flow is not already included in the sticky service table. The initial ingress router 113 can then add an entry in the sticky service table to identify the flow and the egress router 131. For example, the flow can be identified by the anycast address, the sticky service ID, the IP address of the UE 101, and/or a flow label that identifies the flow. The initial ingress router 113 can then route the flow based on the entry in the sticky service table that contains the IP address of the egress router 131. So long as the sticky service table and/or entries thereof can be shared with the subsequent ingress router 117, the subsequent ingress router 117 can also forward UE 101 packets to the egress router 131 after a UE 101 moves based on the sticky service table. It should be noted that the sticky service table entries may also include timers to allow stale entries to be removed from the sticky service table. In one example, the 5G network 110 notifies the IP network 120 when the UE 101 moves from the initial 5G site 111 to the subsequent 5G site 115. For example, the 5G network 110 may also include a 5G EC management system 119. The 5G EC management system 119 can be part of a 5G core (5GC). The 5G EC management system 119 is a component configured to manage edge computing functionality on behalf of the 5G network 110. The 5G EC management system 119 may receive a notification whenever a UE using edge computing services, such as a UE 101, moves between 5G sites. Accordingly, the 5G EC management system 119 notifies the initial ingress router 113 when the UE 101 moves to the subsequent 5G site 115. For example, the 5G EC management system 119 may indicate to the initial ingress router 113 that the UE 101 is being handed over to the subsequent 5G site 115 attached to the subsequent ingress router 117. The Notification sent by the 5G EC management system 119 to the initial ingress router 113 may include the following information: the address of the new PSA that the UE is to be anchored and the UE's new IP address. The initial ingress router 113 can then send the sticky service table entry (or entries) associated with the UE 101 to the subsequent ingress router 117. In another embodiment, the initial ingress router 113 can send the "Sticky Service ID" (e.g. ANYCAST Address)+Sticky-Dst-SubTLV to the subsequent ingress router 117. The subsequent ingress router 117 can use information included in the notification from initial ingress router 113 to set up an ACL to filter packets associated with the same flow of the sticky service and continue to forward UE 101 packets belonging to the same flow to the egress router 131 after the UE 101 move based on the sticky service table entry instead of based on default anycast forwarding.

In another embodiment, the old UPF attached to the initial ingress router 113 may record the Sticky-Dst-SubTLV extracted from packets of the sticky service flow, and then send, to SMF of 5GC, the Sticky-Dst-SubTLV by N4 signaling defined by 5G standard. During handover operations, the SMF populates the "Sticky Service ID" (e.g. ANYCAST Address)+Sticky-Dst-SubTLV to the new UPF. The new UPF can add a Destination Extension Header or routing extension header in to the IPv6 packets from the UE recently attached to the new UPF. Regarding subscribing to Network Exposure Function (NEF), this results in a per flow state transfer between two domains (e.g., the 5G domain and the application domain). This process functions, but may face certain scalability inefficiencies. This approach may also require SA2 changes and coordination with a third-party domain.

In another example, the 5G network 110 does not notify the IP network 120 when the UE 101 moves. In this example, the initial ingress router 113 periodically advertises the sticky service table to a group of routers, denoted as a neighboring ingress group, containing the subsequent ingress router 117. Each router in the neighboring ingress group can then add the advertised sticky service table entries into each router's local sticky service table. As with the previous example, the ingress routers forward a packet to the lowest cost egress router when no entry is included in the sticky service table. But the initial ingress router 113 and the subsequent ingress router 117 both forward packets to the egress router 131 when an entry in the sticky service table indicates the flow and the IP address of the egress router 131. Accordingly, the subsequent ingress router 117 can use the advertised sticky service table to continue to forward UE 101 packets to the egress router 131 after the UE 101 moves based on the sticky service table instead of based on default anycast forwarding.

Figure 2:
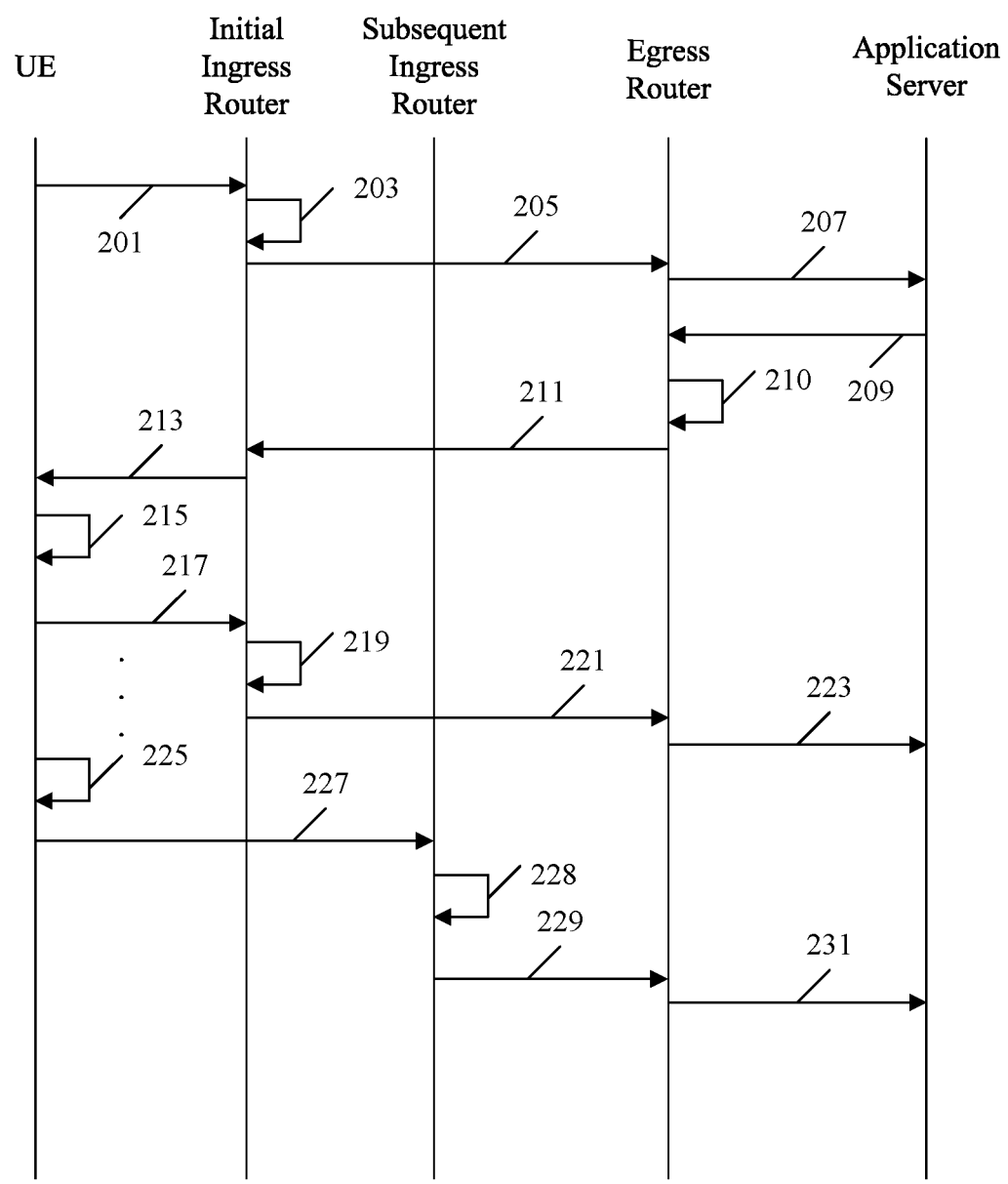
FIG. 2 is a protocol diagram of an example method of employing a UE and an egress router to manage sticky services.

FIG. 2 is a protocol diagram of an example method 200 of employing a UE and an egress router to manage sticky services. Specifically, method 200 operates on a UE, an initial ingress router, a subsequent ingress router, an egress router, and an application server, such as the UE 101, the initial ingress router 113, the subsequent ingress router 117, the egress router 131, and the application server 133, respectively. It should be noted that the packets discussed below are described by numbers (e.g., first packet, second packet, etc.). Such numbering is for clarity of discussion, and other unnumbered packets may also be communicated in a manner similar to the numbered packets. For example, many packets may be sent between the third packet and the fourth packet. Therefore, the numbering should be considered as explanatory and not limiting.

The method 200 begins when the UE initiates a sticky service based flow to an application operating on an application server. Method 200 presumes that the routers have already been configured to support sticky services, for example by an EC sticky service management system 125. At step 201, the UE is connected to an initial 5G site. So, the UE transmits a first packet to the 5G site, for example to an initial PSA. The packet is then forwarded to the initial ingress router. The first packet may or may not be the first packet of a flow, depending on the example. The UE sets the destination address of the first packet to the anycast address associated with the application server.

At step 203, the initial ingress router filters the first packet through the ACL at the initial ingress router and determines that the anycast address in the first packet is associated with a sticky service. The initial ingress router may also review the packet header for a Sticky-Dst-SubTLV. Since the flow has not previously been routed to an egress router, the first packet does not contain the Sticky-Dst-SubTLV. Accordingly, the initial ingress router routes the first packet based on the anycast address. Specifically, the initial ingress router determines the lowest cost application server that employs the anycast address and addresses the first packet to the egress router attached to the application server, for example by encapsulating the first packet with a stack of labels that define an IP tunnel terminating at the egress router. The first packet is then forwarded to the egress router along the tunnel at step 205. For example, each node along the path between the initial ingress router and the egress router may remove a label and forward the packet according to the next label in the stack, with the subsequent label directing the packet to the egress router. The egress router can then decapsulate the first packet.

At step 207, the egress router forwards the first packet to the application server based on the anycast address destination of the first packet. At step 209, the application server responds with a second packet of the flow directed back to the UE. Specifically, the application server sets the destination address of the second packet to the IP address of the UE. At step 210, the egress router filters the second packet through the ACL at the egress router and determines the source address is any anycast address associated with a sticky service. Based on this determination, the egress router inserts a Sticky-Dst-SubTLV into a header in the packet. The Sticky-Dst-SubTLV contains the IP address of the egress router. In an example, the Sticky-Dst-SubTLV is inserted into an IPv6 destination options header in the second packet. The egress router then forwards the second packet to the initial ingress router which is communicatively connected to the initial 5G site associated with the UE at step 211. The initial ingress router then forwards the second packet toward the UE at step 213. The initial 5G site then forwards the send packet to the UE via the initial PSA and the gNB.

At step 215, the UE sends a third packet to the application server as part of the flow. The UE generates the third packet and copies the IPv6 destination options header from the second packet into the third packet. Accordingly, the third packet contains a header that includes the Sticky-Dst-SubTLV having the IP address of the egress router. The UE sets the destination address of the third packet to the anycast address of the application server and forwards the third packet across the initial 5G site at step 217. The third packet is routed to the initial ingress router attached to the initial 5G site.

At step 219, the initial ingress router filters the third packet through the ACL and determines that the anycast address in the third packet is associated with a sticky service. The initial ingress router may also review the packet header for a Sticky-Dst-SubTLV. Unlike at step 203, this time the initial ingress router finds the Sticky-Dst-SubTLV. Accordingly, the initial ingress router routes the third packet based on the Sticky-Dst-SubTLV instead of based on the anycast address. The initial ingress router finds the IP address of the egress router in the Sticky-Dst-SubTLV and forwards the third packet to the egress router via an IP tunnel at step 221. The egress router then forwards the third packet to the application server at step 223 in a manner similar to step 207.

This process may continue for some time until the UE moves to a different 5G site, denoted herein as the subsequent 5G site for clarity of discussion. At step 225, the UE determines to send a fourth packet to the application server in a manner similar to step 215. The UE copies the header IPv6 destination options header from the last packet received from the application server into the fourth packet. Accordingly, the fourth packet contains a header that includes the Sticky-Dst-SubTLV having the IP address of the egress router. The UE sets the destination address of the fourth packet to the anycast address of the application server and forwards the fourth packet across the subsequent 5G site at step 227. The fourth packet is routed to the subsequent ingress router attached to the subsequent 5G site.

At step 228, the subsequent ingress router treats the fourth packet in a similar manner to treatment of the third packet at the initial ingress router at step 219. Namely, the subsequent ingress router filters the fourth packet through the ACL at the subsequent ingress router and determines that anycast address in the fourth packet is associated with a sticky service. The subsequent ingress router also reviews the packet header and finds the Sticky-Dst-SubTLV with the IP address of the egress router. Accordingly, the subsequent ingress router routes the fourth packet based on the Sticky-Dst-SubTLV instead of based on the anycast address. The subsequent ingress router finds the IP address of the egress router in the Sticky-Dst-SubTLV and forwards the fourth packet to the egress router via an IP tunnel at step 229. The egress router then forwards the packet to the application server at step 231.

By inserting the Sticky-Dst-SubTLV into the downstream packets at the egress router and copying the packet headers from downstream packets into upstream packets, the upstream packets are routed back to the egress router instead of being routed based on the anycast address. Accordingly, the Sticky-Dst-SubTLV causes the flow to stick to the first egress router used for the flow even when the UE moves to a different 5G site that may be closer to a different instance of the application server. In the event that the UE wishes to unstick the flow (e.g., when latency becomes too great), the UE can discontinue copying the downstream header onto the next upstream packet. This will cause the flow to be routed according to the anycast address to the closest application server. The UE may then begin copying the headers again to cause the flow to stick to a different egress router as desired.

Figure 3:
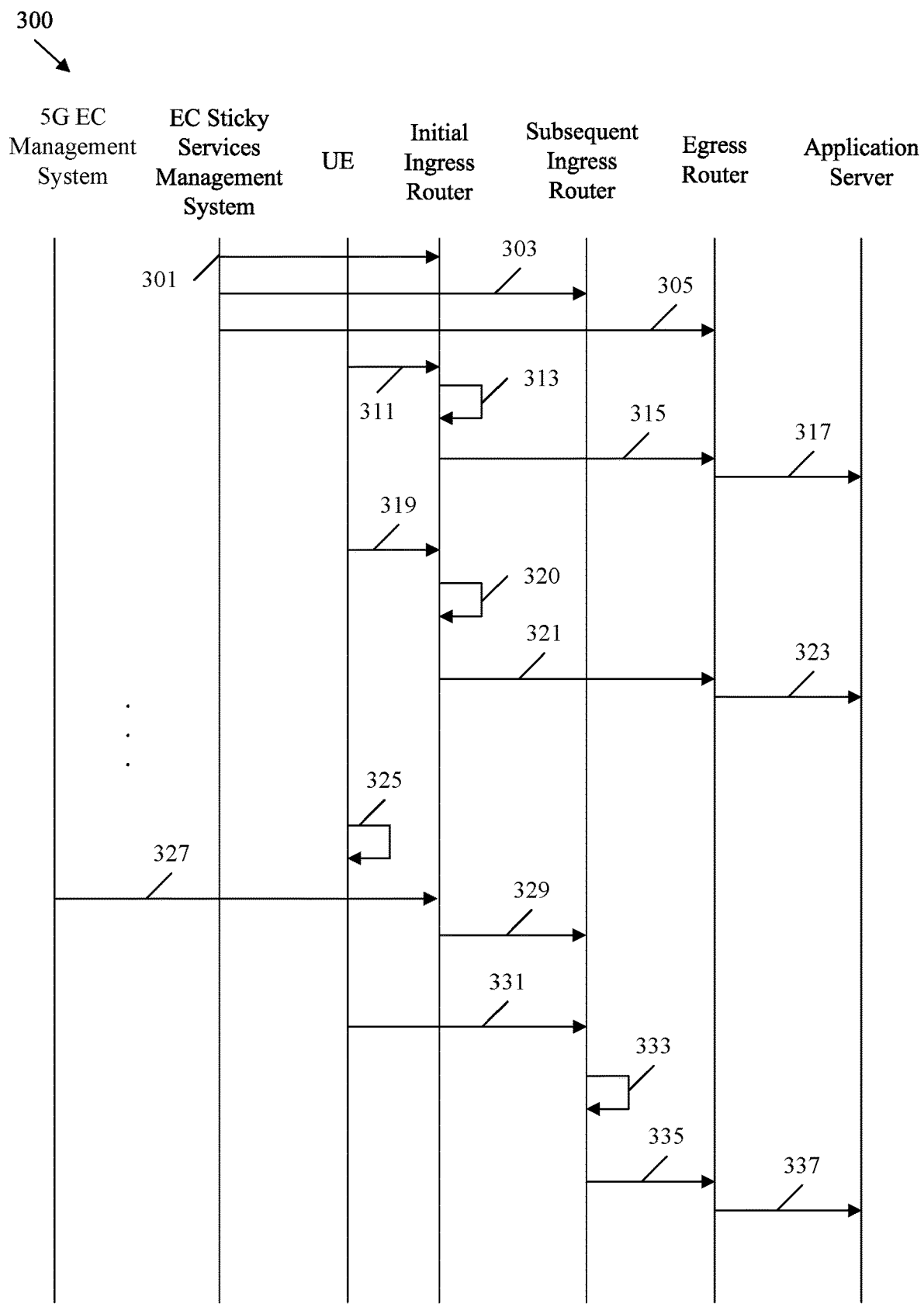
FIG. 3 is a protocol diagram of an example method of employing an ingress router to manage sticky services based on information from the 5G network.

FIG. 3 is a protocol diagram of an example method 300 of employing an ingress router to manage sticky services based on information from the 5G network. Specifically, method 300 operates on a 5G EC management system, an EC sticky services management system, a UE, an initial ingress router, a subsequent ingress router, an egress router, and an application server, such as the 5G EC management system 119, the EC sticky services management system 125, the UE 101, the initial ingress router 113, the subsequent ingress router 117, the egress router 131, and the application server 133, respectively. As with method 200, the packets of method 300 discussed below are described by numbers (e.g., first packet, second packet, etc.). Such numbering is for clarity of discussion, and other unnumbered packets may also be communicated in a manner similar to the numbered packets. Therefore, the numbering should be considered as explanatory and not limiting.

The method 300 begins when the EC sticky services management system configures routers with sticky service IDs. For example, the EC sticky services management system may receive a request from a user to register an anycast address for an application operating on the application server as a sticky service ID. At step 301, the EC sticky services management system sends a configuration message to the initial ingress router. The configuration message configures the ACL on the initial ingress router to filter packets in order to identify packets with the anycast address of the application server as the source address and/or destination address as sticky service related packets. At step 303, the EC sticky services management system sends a configuration message to the subsequent ingress router. The configuration message configures the ACL on the subsequent ingress router in a manner similar to the initial ingress router at step 301. At step 305, the EC sticky services management system sends a configuration message to the egress router. The configuration message configures the ACL on the egress router in a manner similar to the initial ingress router at step 301. Accordingly, the configuration messages of steps 301, 303, and 305 configure the routers in the IP network to recognize the anycast address of the application server as being associated with a sticky service.

It should be noted that steps 301, 303, and 305 may also be employed with respect to method 200 as described above in some examples.

At step 311, the UE is connected to an initial 5G site. So, the UE transmits a first packet to the 5G site, for example to an initial PSA. The packet is then forwarded to the initial ingress router. The first packet may or may not be the first packet of a flow, depending on the example. The UE sets the destination address of the first packet to the anycast address associated with the application server. It should be noted that method 300 assumes the UE is not configured to assist with sticky services management. Therefore, the UE forwards the first packet based on the anycast address without considering sticky services related mechanisms and leaves such management to the IP network components.

At step 313, the initial ingress router filters the first packet through the ACL at the initial ingress router and determines that the anycast address in the first packet is associated with a sticky service. The initial ingress router checks a sticky service table stored on the initial ingress router to determine whether the first packet is associated with a flow that is already stuck to an egress router. In this example, the first packet is not included in the sticky service table. So the initial ingress router prepares to route the first packet according to default anycast address routing behavior. Specifically, the initial ingress router determines the lowest cost application server that employs the anycast address. The initial ingress router then adds an entry in the sticky service table for the flow containing the first packet. The entry may include the anycast address as a sticky service ID and data identifying the flow. For example, the data identifying the flow may include a flow label and/or an IP address of the UE. The entry may also include a timer that can be refreshed when the initial ingress router receives further packets associated with the flow. The entry can then be removed in the event that the timer expires in order to remove stale flows from the sticky service table.

At step 315, the initial ingress router addresses the first packet to the egress router attached to the application server, for example by encapsulating the first packet with a stack of labels that define an IP tunnel terminating at the egress router. The first packet is then forwarded to the egress router along the tunnel. For example, each node along the path between the initial ingress router and the egress router may remove a label and forward the packet according to the next label in the stack, with the final label directing the packet to the egress router. The egress router can then decapsulate the first packet. At step 317, the egress router forwards the first packet to the application server based on the anycast address destination of the first packet. The application server responds with packets directed to the IP address of the UE as desired. However, unlike method 200, method 300 may not use the downstream packets from the application server to disseminate sticky service information.

At step 319, the UE sends a second packet to the initial ingress router in a manner substantially similar to step 311. At step 320, the initial ingress router filters the second packet through the ACL at the initial ingress router and determines that the anycast address in the second packet is associated with a sticky service. The initial ingress router then checks the sticky service table stored on the initial ingress router and determines that an entry already exists for the flow based on the anycast address and the flow identification data. The initial ingress router can then refresh the timer for the entry and route the second packet according to the sticky service table entry at step 321. Specifically, the initial ingress router can route the packet to the egress router via an IP tunnel based on the IP address of the egress router stored in the sticky service table entry instead of routing based on the anycast address. At step 323, the egress router forwards the second packet to the application server based on the anycast address destination of the second packet.

At step 325, the UE moves to a subsequent 5G site and is handed over from an initial PSA at the initial 5G site to a subsequent PSA at the subsequent 5G site. Method 300 presumes that the 5G network is configured to help support sticky services management. Specifically, the 5G EC management system is made aware of the UE handover at step 325, for example by one or more of the PSAs. At step 327, the 5G EC management system notifies the initial ingress router that the UE has moved and is now connected to a 5G site connected to the subsequent ingress router. For example, the 5G EC management system may notify the initial ingress router of the UE connection to the subsequent 5G site, the UE connection to the subsequent ingress router, a different IP address for the UE that is associated with a subsequent PSA at the subsequent 5G site, etc.

At step 329, the initial ingress router sends the sticky service table entry for the UE to the subsequent ingress router. This notifies the subsequent ingress router that the UE is associated with an active sticky services flow connected to the egress router. This also notifies the subsequent ingress router of the IP address of the egress router to allow continued forwarding of the flow to the egress router.

At step 331, the UE sends a third packet to the subsequent ingress router via a 5G gNB and a subsequent PSA. At step 333, the subsequent ingress router filters the third packet through the ACL at the subsequent ingress router and determines that the anycast address in the third packet is associated with a sticky service. The subsequent ingress router then checks the sticky service table stored on the subsequent ingress router. The subsequent ingress router finds the sticky service table entry for the flow as received from the initial ingress router at step 329. Accordingly, the subsequent ingress router determines that an entry already exists for the flow based on the anycast address and the flow identification data. The subsequent ingress router can refresh the timer for the entry and route the third packet according to the sticky service table entry at step 335. Specifically, the subsequent ingress router can route the packet to the egress router via an IP tunnel based on the IP address of the egress router stored in the sticky service table entry instead of routing based on the anycast address. At step 337, the egress router forwards the third packet to the application server based on the anycast address destination of the third packet.

By saving the IP address of the egress server in an entry in a sticky service table, the flow packets from the initial ingress router are forwarded to the egress server. Further, sharing the sticky service table entry with the subsequent ingress router causes the subsequent ingress router to continue forwarding the flow packets to the egress router even when the UE moves to a subsequent 5G site. As such, the sticky service table causes the flow to stick to the first egress router used for the flow even when the UE moves to a different 5G site that may be closer to a different instance of the application server. The flow may be unstuck by the IP network. For example, the flow may be removed from the sticky service table when the timer expires. Further, the ingress nodes may be limited to sharing sticky service table entries within a certain number of hops (of the ingress router, the egress router, etc.) This may allow a flow to be unstuck when the UE moves so far away from the egress router that routing to the initial egress router is more disruptive to communications than sticking the flow to a new egress router.

Figure 4:
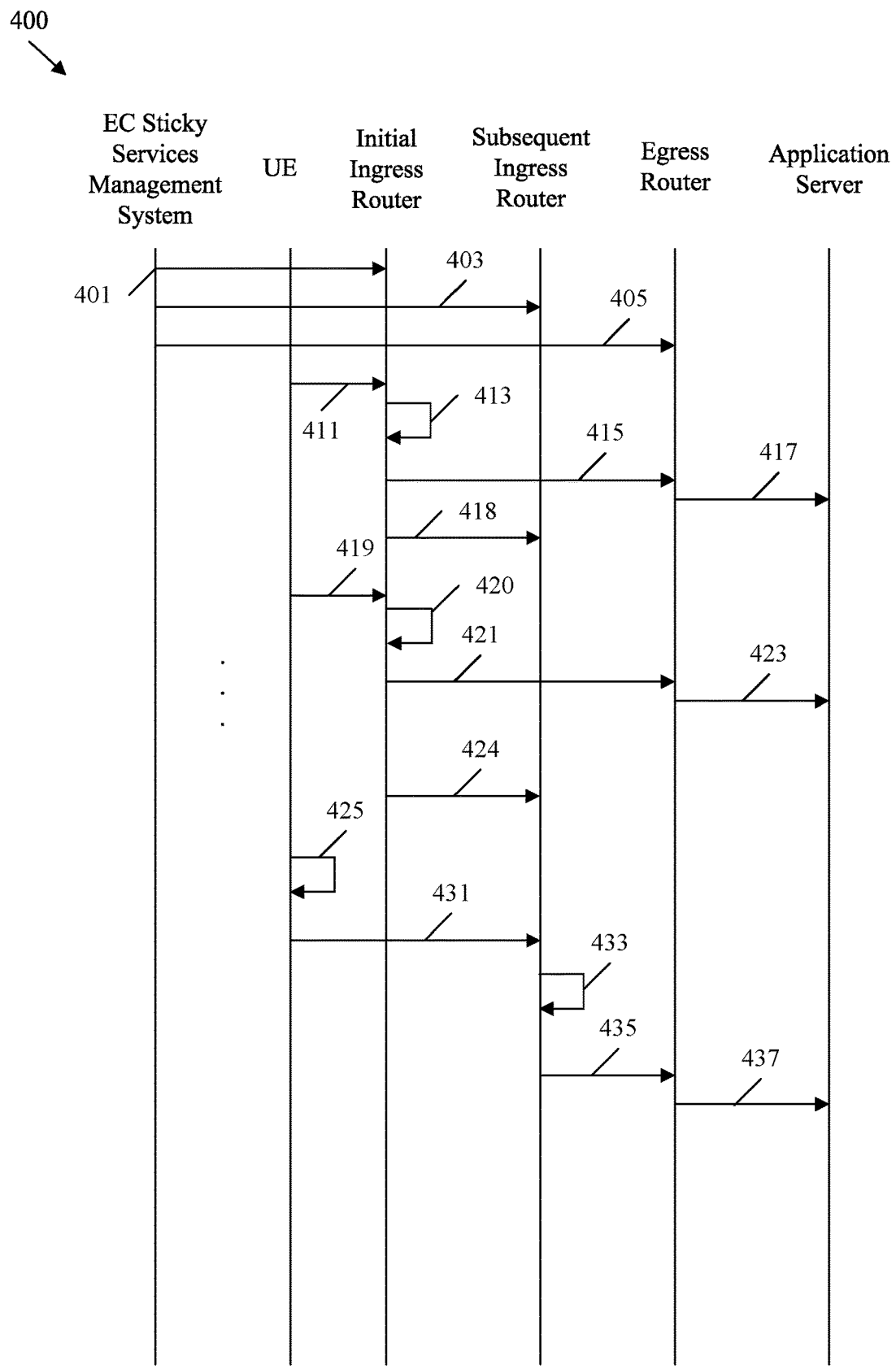
FIG. 4 is a protocol diagram of an example method of employing an ingress router to manage sticky services without input from the 5G network.

FIG. 4 is a protocol diagram of an example method 400 of employing an ingress router to manage sticky services without input from the 5G network. Specifically, method 400 operates on an EC sticky services management system, a UE, an initial ingress router, a subsequent ingress router, an egress router, and an application server, such as the EC sticky services management system 125, the UE 101, the initial ingress router 113, the subsequent ingress router 117, the egress router 131, and the application server 133, respectively. As with methods 200 and 300, the packets of method 400 discussed below are described by numbers (e.g., first packet, second packet, etc.). Such numbering is for clarity of discussion, and other unnumbered packets may also be communicated in a manner similar to the numbered packets. Therefore, the numbering should be considered as explanatory and not limiting.

Method 400 is similar to method 300, but presumes that the 5G network is not configured to notify the IP network when a UE moves between 5G sites. Steps 401, 403, 405, 411, 413, 415, and 417 are substantially similar to steps 301, 303, 305, 311, 313, 315, and 317, respectively. However, in method 400 the initial ingress router does not know whether the UE has moved to another 5G network. Further, the initial ingress router does not know which 5G site the UE is likely to move to, and hence does not know which ingress router should receive the sticky service table entry for the UE.

To address these issues, the initial ingress router periodically shares the initial ingress router's sticky service table with a group of neighboring ingress routers in a neighboring ingress group to support routing subsequent packets to the egress server upon movement of the UE between 5G sites. As such, at step 418 the initial ingress router broadcasts the initial ingress router's sticky service table to all neighboring ingress routers including the subsequent ingress router. The subsequent ingress router then adds the non-duplicative entries from the initial ingress router's sticky service table to the subsequent ingress router's sticky service table. The result is that all ingress routers in the group of neighboring ingress routers have substantially the same information in corresponding sticky service tables.

The UE can route packets through the initial ingress router for routing to the egress router according to the sticky service table at the initial ingress router. Accordingly, steps 419, 420, 421, and 423 are substantially similar to steps 319, 320, 321, and 323, respectively, in method 300.

Since the initial ingress router does not know when the UE moves to a different 5G site, the initial ingress router continues to broadcast the initial ingress router's sticky service table. As such, the initial ingress router broadcasts the initial ingress router's sticky service table to all neighboring ingress routers including the subsequent ingress router at step 424 in a manner substantially similar to step 418.

At step 425, the UE moves to a subsequent 5G site in a manner similar to step 325. The UE then transmits a third packet to the subsequent ingress router at step 431 in a manner similar to step 331. At step 433, the subsequent ingress router filters the third packet through the ACL at the subsequent ingress router and determines that the anycast address in the third packet is associated with a sticky service. The subsequent ingress router then checks the sticky service table stored on the subsequent ingress router. Since the subsequent ingress router received the entries from the initial ingress router's sticky service table at steps 418 and/or 424, the subsequent ingress router finds the sticky service table entry for the flow. Accordingly, the subsequent ingress router determines that an entry already exists for the flow based on the anycast address and the flow identification data. The subsequent ingress router can refresh the timer for the entry and route the third packet. Accordingly, steps 435 and 437 are substantially similar to steps 335 and 337, respectively.

By saving the IP address of the egress server in an entry in a sticky service table, the flow packets from the initial ingress router are forwarded to the egress server. Further, by broadcasting each ingress router's sticky service table to other neighboring ingress routers, the subsequent ingress router receives the corresponding sticky service table entry for the UE even though the IP network components are not notified of the movements of the UE.

Figure 5:
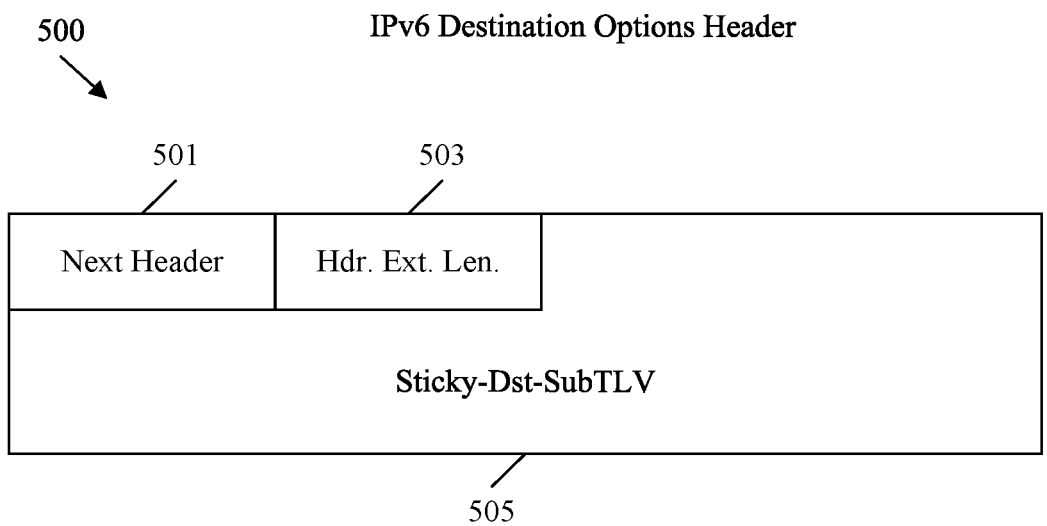
FIG. 5 illustrates an example IP version six (IPv6) destination options header for use with sticky services.

FIG. 5 illustrates an example IPv6 destination options header 500 for use with sticky services. For example, the IPv6 destination options header 500 can be communicated between a UE 101 and an egress router 135 as part of method 200. For example, the egress router can insert the IPv6 destination options header 500 into downstream packets and the UE can copy the IPv6 destination options header 500 into upstream packets. This allows the IPv6 destination options header 500 to communicate the IP address of the egress router to the ingress routers, and hence allows the ingress routers to stick a corresponding flow to the egress router.

The IPv6 destination options header 500 is specified by Internet Engineering Task Force (IETF) document Request For Comment (RFC) 8200 and includes a next header field 501, which may be eight bits long and may extend from bit position zero to bit position seven. The next header field 501 identifies the type of header immediately following the IPv6 destination options header 500. The next header field 501 may be set to a value of sixty (60). The IPv6 destination options header 500 also includes a header extension length field 503, which may be eight bits long and may extend from bit position eight to bit position fifteen. The header extension length field 503 may contain the length of the IPv6 destination options header 500 in eight octet units, not including the first eight octets. The IPv6 destination options header 500 also includes a Sticky-Dst-SubTLV field 505. The Sticky-Dst-SubTLV field 505 is of variable length, follows the header extension length field 503, and hence extends from bit position sixteen. The Sticky-Dst-SubTLV field 505 contains the IP address of the egress router to support sticky services.

Figure 6:
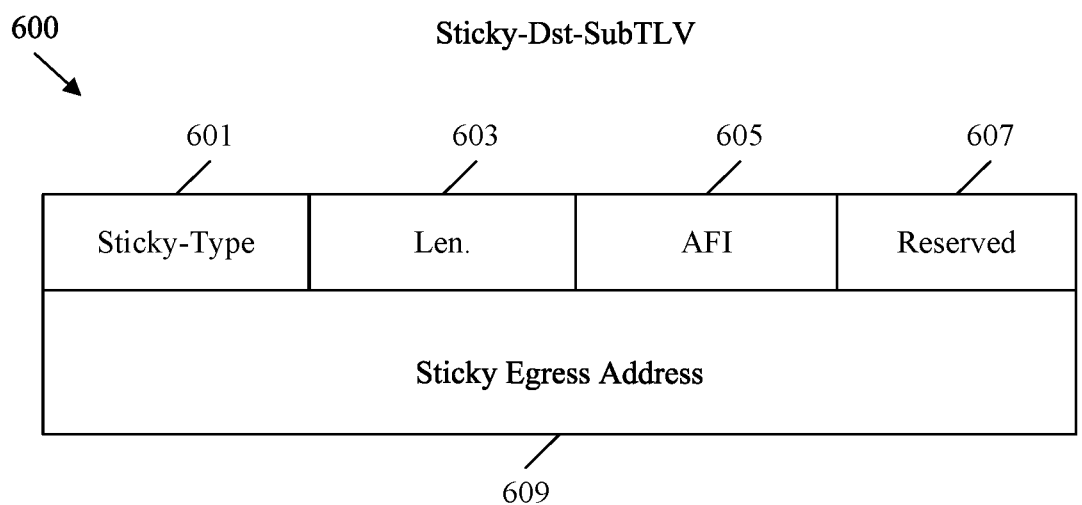
FIG. 6 illustrates an example sticky destination sub type length value (Sticky-Dst-SubTLV) structure.

FIG. 6 illustrates an example Sticky-Dst-SubTLV structure 600. For example, the Sticky-Dst-SubTLV structure 600 can be included in an IPv6 destination options header 500 in a Sticky-Dst-SubTLV field 505. The Sticky-Dst-SubTLV structure 600 includes a sticky-type field 601, which may be eight bits long and may extend from bit position zero to bit position seven. The sticky-type field 601 may be set to a value to indicate the type of IP address contained in the Sticky-Dst-SubTLV structure 600. For example, the sticky-type field 601 may be set to one to indicate that a sticky egress unicast address is encoded in the Sticky-Dst-SubTLV structure 600. The Sticky-Dst-SubTLV structure 600 also includes a length field 603, which may be eight bits long and may extend from bit position eight to bit position fifteen. The length field 603 may be set to a value to indicate the length of the Sticky-Dst-SubTLV structure 600 (e.g., in octets). The Sticky-Dst-SubTLV structure 600 also includes an address family identifier (AFI) field 603, which may be eight bits long and may extend from bit position sixteen to bit position twenty-three. The AFI field 603 may be set to a value to indicate whether the Sticky-Dst-SubTLV structure 600 contains an IPv4 address or an IPv6 address. The Sticky-Dst-SubTLV structure 600 also includes a reserved field 607, which may be eight bits long and may extend from bit position twenty-three to bit position thirty-one. The reserved field 607 may be reserved for other functions. The Sticky-Dst-SubTLV structure 600 also includes a sticky egress address field 609, which can be set to the IP address of an egress router used to reach an application server with a corresponding anycast address. It should be noted that the Sticky-Dst-SubTLV structure 600 can also be included in a service parameter subTLV field.

Figure 7:
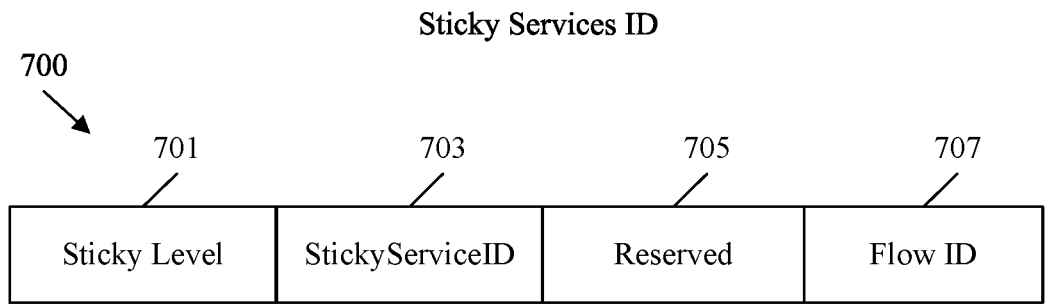
FIG. 7 illustrates an example sticky service identifier (ID) for use as an application-aware ID.

FIG. 7 illustrates an example sticky service ID 700 for use as an application-aware ID. For example, the sticky service ID 700 can be used in a packet header, for example according to method 200 to communicate sticky service data to a UE. The sticky service ID 700 includes a sticky level field 701, which may be eight bits long and may extend from bit position zero to bit position seven. The sticky level field 701 contains a value indicating a sticky level. For example, the sticky level can be used to represent a level of importance that an application stick to a corresponding anycast servers. Some applications may prefer, but not require flow sticking to an original anycast server. Other applications may require the stickiness. The sticky level field 701 can be used to communicate this information. The sticky service ID 700 also includes a sticky service ID field 703, which may be eight bits long and may extend from bit position eight to bit position fifteen. The sticky service ID field 703 may include the anycast address of an application server. The sticky service ID 700 also includes a reserved field 705, which may be eight bits long and may extend from bit position sixteen to bit position twenty-three. The reserved field 705 may be reserved for containing an identifier for the flow in the 5G access domain. The sticky service ID 700 also includes a flow ID field 707, which may be eight bits long and may extend from bit position twenty-four to bit position thirty-one. The flow ID field 707 may contain an identifier for a flow that should stick to a specific anycast server.

Figure 8:
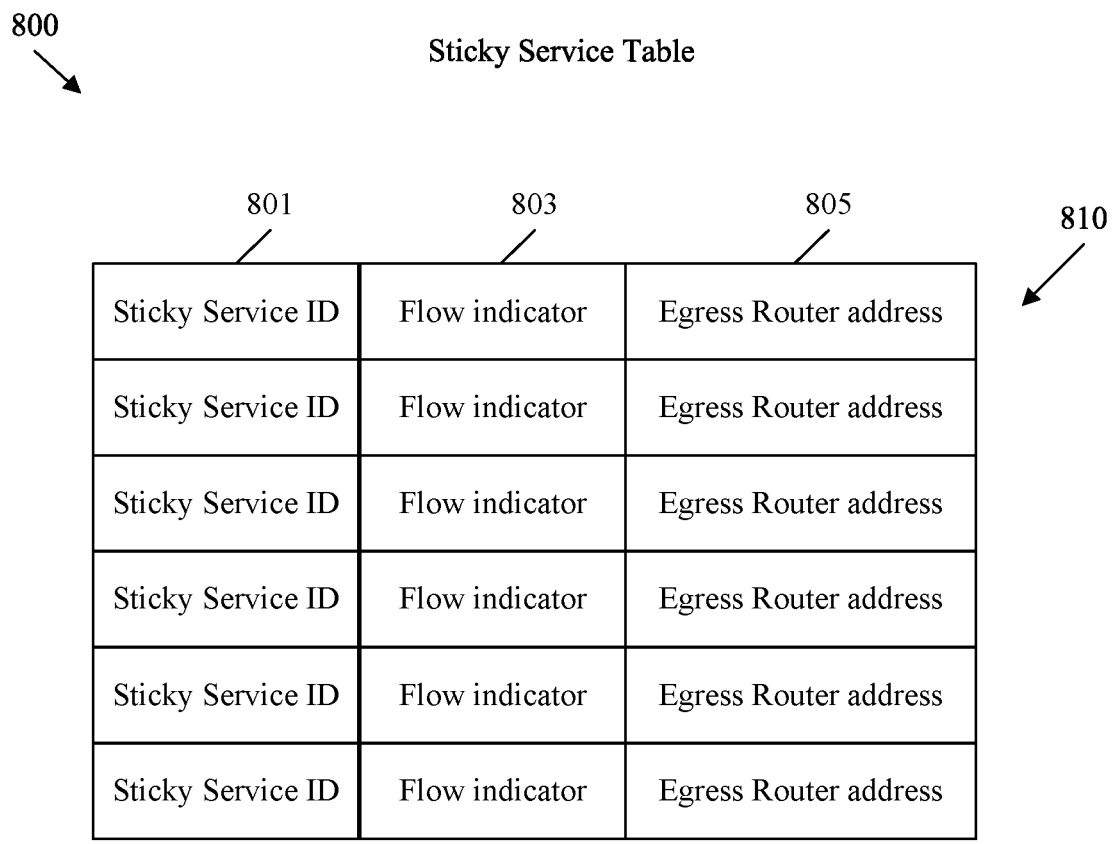
FIG. 8 illustrates an example sticky service table.

FIG. 8 illustrates an example sticky service table 800, which may be employed by an initial ingress router 113 and/or a subsequent ingress router 117 for example in method 300 and/or 400. The sticky service table 800 contains various entries 810. Each entry identifies a sticky flow. An entry includes at least a sticky service ID 801, a flow indicator 803, and an egress router address 805. An entry may also contain a timer to support timeout and/or staleness functions. The sticky service ID 801 may contain an anycast address of an application that uses sticky flows. The flow indicator 803 contains any data that uniquely identifies a flow, such as a UE IP address and/or a flow label. The egress router address 805 may contain the IP address of the egress router to which the flow should stick, where the flow is identified by the corresponding sticky service ID 801 and flow indicator 803.

In an example, the preceding embodiments may be implemented as follows. This document describes an IPv6 solution that can stick an application flow originated from a mobile device to the same anycast server location when the mobile device moves from one 5G cell site to another. This solution expands Application-aware ID and Service parameter options by including anycast Sticky Service location information in an IPv6 Hop-by-Hop or Destination Optional Header. It should be noted that the terms Destination Optional Header, destination option header, destination options header and similar terms are used interchangeably to carry optional information that should be examined only by a packet's destination node(s) or router(s).

One application in 5G edge computing environment can have multiple application servers hosted in different Edge Computing data centers in close proximity. Those edge computing data centers may be very close to, or co-located with, a 5G base stations, to minimize latency and optimize performance. When a mobile device sends packets using the destination address from a domain name service (DNS) reply or its own cache, the packets are carried by a General Packet Radio Service (GPRS) Tunneling Protocol (GTP) tunnel from the 5G gNB to the 5G user plan function (UPF)-PSA. The UPF-PSA decapsulates the 5G GTP outer header and forwards the packets from the mobile devices to the ingress router of the EC LDN. The IP network is responsible for forwarding the packets to the intended destinations.

When the UE launches an application, the UE sends DNS a query to resolve the application name (app.net). The DNS replies with A/AAAA records. For the rest of the flow sequence, IPv4 (G-4) is used. The UE initiates application request (e.g., HTTPS) with destination address G-4. The PDU is forwarded to a UPF-PSA attached to the UE. UPF-PSA terminates GTP and forwards IP packet with destination address G-4 to the IP network. Routers in the IP network select an application server out of {E1, E2, E3}. In the rest of the sequence, the assumption is that a LDN (LDN1) is selected. Since this is a stateful application, the application server issues a redirect request with new URL. In this case, the URL is set to that of the local data center—ldn1.op1.app.net. The IP address translation directs packets to E1, except in case of site failure.

The UE sends the DNS a query to resolve the redirect URL—ldn1.op1.app.net and DNS replies with anycast address L1. The UE continues application requests with anycast address:1 as destination address. The PDU is forwarded to the UPF-PSA. The UPF-PSA terminates GTP and forwards IP packet with anycast address L1 to the IP network. The routing rules configured assure that anycast address L1 is always forwarded to LDN1, except in case of LDN1 site failure. A handover procedure is employed where UE has a PDU session from new location. In the case of Session and Service Continuity mode three (SSC mode 3), the UE continues to receive packets on the old gNB (gNB1) for a short period of time. The UE initiates application layer message when there is a change of IP address. This is to ensure that pending downstream packets get directed to the UE attached to the new UPF-PSA.

When the mobile device moves out of coverage of a current gNB, handover procedures are initiated, and a 5G Session Management Function (SMF) selects a new UPF-PSA. When the handover process is complete, the mobile device is anchored to a new UPF-PSA. The 5G SMF may maintain a path from the old UPF to the new UPF for a short period of time for SSC mode 3 to make the handover process more seamless. The 5G SMF is part of 5GC or a 5G EC management system.

5G EC network properties are now discussed. In this document, a 5G edge computing network refers to multiple LDNs in one region that interconnect the EC mini-data centers. Those IP LDN networks are the N6 interfaces from 3GPP 5G perspective. The ingress routers to the 5G Edge Computing Network are directly connected to 5G UPFs. The egress routers to the 5G Edge Computing Network are the routers that have a direct link to the Edge Computing servers. The servers and the egress routers are co-located. Some of those mini Edge Computing Data Centers may have virtual switches or Top of Rack switches between the egress routers and the servers. But transmission delay between the egress routers and the Edge Computing servers is very small, which is considered negligible in this document.

When one mini data center has multiple Edge Computing Servers attached to one Application Layer Load Balancer, only the Application Layer Load Balancer is visible to the 5G Edge Computing Network. The Edge Computer Services are specially managed services that utilize the network topology and balance among multiple mini Edge Computing Data Centers with the same anycast address. A mobile device can access services that are not part of the registered 5G Edge Computing Services.

One problem with anycast in 5G EC Environment is that anycast is used extensively by various application providers because anycast supports dynamic load balancing across multiple locations of the same address based on network conditions. When multiple servers in different locations have the same anycast IP address, routers see multiple paths to the IP address. Application server location selection using anycast address leverages the proximity information present in the network routing layer and eliminates the single point of failure and bottleneck at the DNS resolvers and application layer load balancers. Another benefit of using anycast address is removing the dependency on mobile devices that use their cached IP addresses instead of querying the DNS when they move to a new location. Having multiple locations for the same anycast address in the 5G Edge Computing environment can be problematic because all those edge computing Data Centers can be close in proximity. There might not be any difference in the routing cost to reach the Application Servers in different Edge DCs. The same routing cost to multiple locations can cause packets from one flow to be forwarded to different locations, which can cause service glitches.

Another problem with anycast relates to sticking to an original application server. When a mobile device moves to a new location but continues the same application flow, routers at the new location might choose the App. Server closer to the new location. When the UE in a first 5G site moves to the second 5G Site, the router directly connected to second 5G PSA might forward the packets destined towards the first application server to the server located in a second LDN because second LDN has the lowest cost based on routing. This is not the desired behavior for some services, which are called Sticky Services in this document. Even for some advanced applications with built-in mechanisms to re-sync the communications at the application layer after switching to a new location, service glitches are often experienced. It is worth noting that not all services need to be sticky. It is assumed that only a subset of services are sticky, and the network is informed of the services that should be sticky, usually by requests from application developers or controllers. This document describes an IPv6-based network layer solution to stick the packets belonging to the same flow of a mobile device to its original App Server location after the mobile device is anchored to a new UPF-PSA.

Another problem relates to application server relocation. When an Application Server is added to, moved, or deleted from a 5G Edge Computing Data Center, the routing protocol has to propagate the changes to 5G PSA or the PSA adjacent routers. After the change, the cost associated with the site might change as well. For ease of description, the Edge Computing Server, Application Server, and/or App Server are used interchangeably throughout this document.

An APN6 is an application aware network using IPv6. The term application has a very broad meaning. In this document the term application refers to any applications that use anycast servers in the 5G Edge Computing Environment. An A-ER is an egress router to an application server. A-ER is used to describe the last router that the Application Server is attached. For 5G EC environment, the A-ER can be the gateway router to a mini Edge Computing Data Center. An Application Server is a physical or virtual server that hosts the software system for the application. The Application Server Location represents a cluster of servers at one location serving the same Application. One application may have a Layer 7 Load balancer, whose address(es) are reachable from external IP network, in front of a set of application servers. From an IP network perspective, this whole group of servers are considered as the Application Server at the location. An Edge Application Server is used interchangeably with Application Server herein. Edge Hosting Environment is an environment providing support for Edge Application Server's execution. An Edge data center (DC) provides the Edge Computing Hosting Environment, and might be co-located with or very close to a 5G Base Station. A Mobile Device (MD) is the same as a UE. The term mobile device or UE, as used herein, should emphasize on sticking services originated from the devices that are mobile to the same server.

From the Local Data Network perspective, achieving Sticky Service for a flow from a mobile device to a specific anycast server is the same as delivering the packets of the flow to the same egress router to which the anycast server is attached. The egress router should deliver the packets destined towards the anycast address to a directly attached server even though the same address is also reachable from other routers, unless the directly attached server is no longer reachable due to server or link failure. The egress router to which the edge computing server is directly attached is called the sticky egress node to the edge computing server at the location. The sticky egress node has a unicast address. When there are multiple Edge Computing Servers with the same anycast address located in different Edge Computing Data Centers, each location is identified by its Sticky Egress nodes unicast address(es). To the LDN's ingress routers, achieving sticky service is to send the packets belonging to the same flow to the same Sticky Egress node's unicast address.

From a Local Data Network perspective, the Sticky Egress nodes' unicast addresses are the Next Hops to reach the Edge Computing server anycast address. The Flow Affinity feature can ensure packets belonging to one flow be forwarded along the same path to the same egress router which then delivers the packets to the attached Edge Computing Server. For IPv6 traffic, Flow Affinity can be supported by the LDN routers forwarding the packets with the same Flow Label in the packets' IPv6 Header along the same path towards the same egress router. For IPv4 traffic, five tuples in the IPv4 header can be used to achieve the Flow Affinity.

This document describes solutions to stick a flow from a mobile device to the same egress router of the App Server after the mobile device moves to a new 5G Site. Solutions within a limited domain are now described. Within a limited domain, mobile devices, edge servers, and network functions are under one administrative domain. Therefore, it is feasible for mobile devices to perform specific actions. A use case of 5G Edge Computing in a limited domain is now discussed. Some 5G Connected devices, such as drones for fighting natural disasters or robots in Industry environments, need ultra-low latency responses from their analytic servers. To reach ultra-low latency, those analytic functions can be hosted on servers very close to radio towers. All the functions (including networking and analytics) and devices may be administrated by one operator. Those functions might be provided by different vendors, therefore needing interoperable solutions.

The routers directly connected to the 5G PSA may learn the addresses of egress routers to which the Edge Server Instances are attached via BGP update messages advertised from those egress routers. For the sake of easy description, the routers that are directly connected to PSA in each 5G site are called 5G site-specific Ingress Routers to the Local Data Network. The 5G site-specific ingress routers learn the egress routers to the Edge Computing server instances by the BGP update messages or the IGP advertisement originated from those routers.

An End-Node-based Sticky Service solution is described as follows. The End-Node-based Sticky Service solution needs IPv6 mobile devices to insert the Destination Option header extracted from the packet received from the network side to the IPv6 Header of the next packet if the next packet belongs to the same flow. This action dramatically simplifies the processing at the LDN's Ingress routers. Here are some assumptions for the End-Node based Sticky Service solution. The mobile devices are under the same administrative control as the Edge computing servers. If an Edge Computing service needs to be sticky in the 5G Edge Computing environment, the corresponding service ID is registered with the 5G Edge Computing controller. The Sticky Service ID can be one or a group of anycast address or regular address.

Here is the overview of the End-Node based Sticky Service solution. Each anycast Edge Computing server either learns or is informed of the unicast Sticky Egress address. The goal is to deliver packets belonging to one flow to the same Sticky Egress address for the anycast address. When an Edge Computing server sends data packets back to a client (or the mobile device), it inserts the Sticky-Dst-SubTLV into the packet's Destination Option Header. The client (or the mobile device) copies the Destination Option Header from the received packet to the next packet's Destination option Header if the next packet belongs to the same flow as the previous packet. If the following conditions are true, the ingress router encapsulates the packet from the client in a tunnel whose outer destination address is set to the Sticky Egress Address extracted from the packet's Sticky-Dst-SubTLV. The destination of the packet from the client-side matches with one of the Sticky Service ACLs configured on the ingress router of the LDN and the packet header has the Destination Option present with Sticky-Dst-SubTLV. Else (one of the conditions above is not true), the ingress node uses an algorithm, such as a least cost algorithm to select the optimal Sticky Egress address for forwarding the packet.

Sticky Egress Address Discovery is now discussed. To an App server with anycast address, the Sticky Egress address is the same as its default Gateway address. A proxy Sticky Egress address can be encoded in the Destination option header to prevent malicious entities sending distributed denial of service (DDOS) attacks to routers within the 5G EC LDN by using the Sticky Egress address that is encoded in the Destination option header in the packets sent back to the clients. The proxy Sticky Egress address is only recognizable by the 5G EC LDN ingress nodes, but not routable in other networks. The LDN ingress routers can translate the proxy Sticky Egress to a routable address for the Sticky Egress node after the source addresses of the packets are authenticated.

Processing at the ingress router is now described. An Ingress router is configured with an ACL for filtering out the applications that need sticky service. Not all applications need sticky service. Using the ACL can significantly reduce the processing on the routers. When an Ingress router receives a packet from the 5G side that matches the ACL, the Ingress router extracts the Sticky-Dst-SubTLV from the packet header when the field exists in the packet header. The ingress can encapsulate the packet with the tunnel type that are supported by the original Sticky Egress node, using the extracted Sticky Egress address in the destination field of the outer Header, and forward the packet. If the proxy Sticky Egress address is encoded in the Sticky-Dst-SubTLV, the ingress router should translate the proxy Sticky Egress address to a routable address. If none of the above conditions are met, the ingress router uses an algorithm to select the optimal Sticky Egress node to forward the packet.

Tunnel based sticky service solutions are now discussed. For environments that mobile devices cannot change their processing behavior, a Tunnel based Sticky Service solution can be used. This solution does not depend on mobile device's behavior, and therefore more processing on the LDN ingress routers is employed. Ingress and Egress Routers processing behavior is now discussed. The solution assumes that both ingress routers and egress routers support at least one type of tunnel and are configured with ACLs to filter out packets whose destination or source addresses match with the sticky service identifier (Sticky Service ID). The solution also assumes there are only limited number of Sticky Services to be supported. An ingress router builds a Sticky-Service-Table, which may include the following one or more attributes: Sticky Service ID, Flow Label, Sticky Egress address, and Timer. The Sticky-Service-Table is initialized to be empty.

When a mobile device moves from one 5G Site to another, the same mobile device may be assigned with a new IP address. The Flow Label and Sticky Service ID may stay the same when a mobile device is anchored to a new PSA. Therefore, this solution uses Flow Label and Sticky Service ID to identify a sticky flow. Since the chance of different mobile devices sending packets to the same anycast address using the same Flow Label is very low, there is a high probability that Flow Label and Sticky Service ID can uniquely identify a flow. When multiple mobile devices using the same Flow Label sending packets to the same anycast address, the solution described in this section will stick the flows to the same anycast server attached to the Sticky Egress router. This behavior doesn't cause any harm.

Each entry in the Sticky-Service-Table has a Timer because a sticky service is no longer sticky if there are no packets of the same flow destined towards the service ID for a period of time. The Timer should be larger than a typical Transmission Control Protocol (TCP) session Timeout value. An entry is automatically removed from the Sticky-Service-Table when its timer expires. Since there are only a small number of Sticky services, the Sticky-Service-Table is not very large. When an ingress router receives a packet from a mobile device matching with one of the Sticky Service ACLs and there is no entry in the Sticky-Service-Table matching the Flow Label and the Sticky Service ID, the ingress router considers the packet to be the first packet of the flow. There is no need to stick the packet to any location. The ingress router uses its own algorithm to select the optimal egress node as the Sticky Egress address for the anycast address, encapsulates the packet with a tunnel that is supported by the egress node. The tunnel's destination address is set to the egress node address.

When an egress router receives a packet from an attached host with the packet's source address matching with one of the Sticky Service IDs, the egress router encapsulates the packet with a tunnel that is supported by the ingress router and the tunnel's destination address is set to the ingress router address. An Egress router learns the ingress router address for a mobile device IP address via border gateway protocol (BGP) update messages. When an ingress router receives a packet in a tunnel from any egress router and the packet's source address matches with a Sticky Service ID, the egress router address is set as the Sticky Egress address for the Sticky Service ID. The ingress router adds the entry of Sticky Service ID, the Flow Label, the associated Sticky Egress address, and the Timer to the Sticky-Service-Table when the entry doesn't exist yet in the table. If the entry exists, the ingress router refreshes the Timer of the entry in the table. When the ingress router receives the subsequent packets of a flow from the 5G side matching with a Sticky Service ID and the Flow Label in the Sticky-Service-Table, the ingress router uses the Sticky Egress address found in the Sticky-Service-Table to encapsulate the packet and refresh the Timer of the entry. When the Sticky Service ID doesn't exist in the table, the ingress router considers the packet as the first packet of a flow.

The following section describes how ingress nodes prorogate their Sticky-Service-Table to their neighboring ingress nodes. The propagation is for neighboring ingress nodes to be informed of the Sticky Egress address to a sticky service when a mobile device moves to a new neighboring 5G site resulting in anchoring to a new ingress node. A solution without communication with 5G system is now discussed. When a mobile device moves to a very far away 5G site, such as a different geographic region, the benefit of sticking to the original anycast server is out weighted by network delay. Then, there is no point sending packets to the Sticky Egress node when the ingress router is very far away. Therefore, it may be necessary for each ingress router to have a group of neighboring ingress routers that are not too far away from the potential Sticky Egress nodes selected by the ingress router. This group of ingress routers is called the Neighboring Ingress Group. Each ingress router can either automatically discover its Neighboring Ingress Group by routing protocols or is configured by a controller. Each ingress node should periodically advertise its Sticky-Service-Table to the routers within its Neighboring Ingress Group. Upon receiving the Sticky-Service-Table from routers in its Neighboring Ingress Group, each ingress router merges the entries from the received Sticky-Service-Table to its own.

A solution that depends on the communication with 5G system is now discussed. In this scenario, there is communication with 5G System and the network is notified when a mobile device is anchored to a new PSA. When a mobile device is re-anchoring from one PSA to another, the 5G EC management system sends a notification to the router that is directly connected to the first PSA. The notification includes the address of the new PSA that the mobile device is to be anchored, and the mobile device's new IP address. In this scenario, the Sticky Service can be uniquely identified by Sticky Service ID and mobile device address. The Sticky-Service-Table should include the following attributes: Sticky Service ID, mobile device address, Sticky Egress address, and Timer.

Upon receiving the notification from the 5G EC management system, the ingress router (the one directly connected to the old PSA) sends the specific entry of the Sticky-Service Table, e.g., the "Sticky Service ID"+mobile device address+ Sticky Egress+Timer to the router directly connected to the new PSA. Upon receiving the entry, the ingress router merges the entry into its own Sticky-Service-Table. The ingress and egress router processing are the same as described above except a flow is now uniquely identified by the "Sticky Service ID"+"mobile device address" instead of "Sticky Service ID"+"Flow Label".

Figure 9:
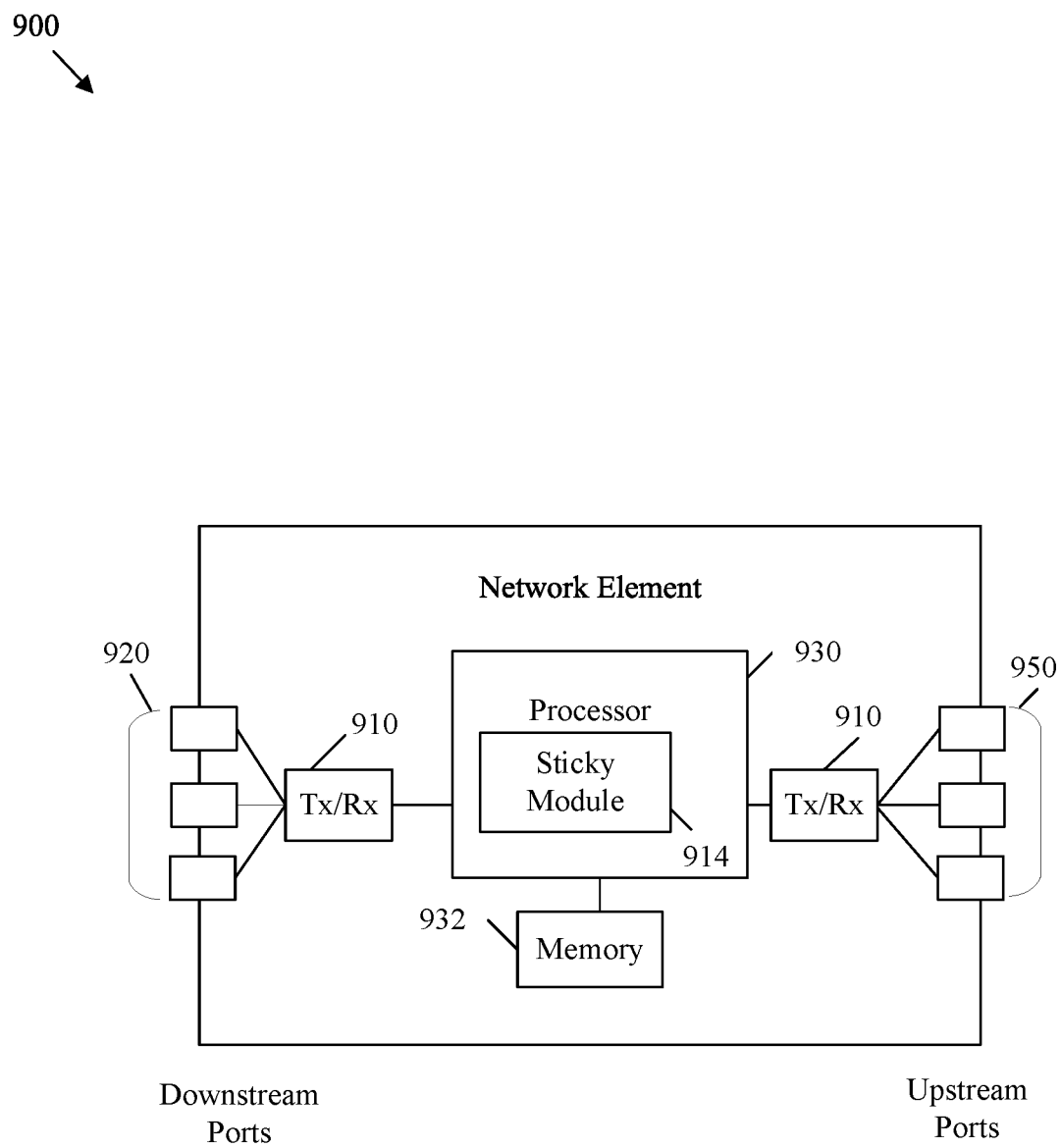
FIG. 9 is a schematic diagram of an example network element for managing sticky services.

FIG. 9 is a schematic diagram of an example network element 900 for managing sticky services, such as an EC sticky service management system 125, a UE 101, an initial ingress router 113, a subsequent router 117, an egress router 131, an application server 133, or other component within network 100. For example, the network element 900 can be employed to implement method 200, 300, 400, 1000, 1100, 1200 and/or 1300 by employing a IPv6 destination options header 500, a Sticky-Dst-SubTLV structure 600, a sticky service ID 700, and/or a sticky service table 800. Hence, the network element 900 is suitable for implementing the disclosed examples/embodiments as described herein. The network element 900 comprises downstream ports 920, upstream ports 950, and/or one or more transceiver units (Tx/Rx) 910, including transmitters and/or receivers for communicating data upstream and/or downstream over a network. The network element 900 also includes a processor 930 including a logic unit and/or central processing unit (CPU) to process the data and a memory 932 for storing the data. The network element 900 may also comprise optical-to-electrical (OE) components, electrical-to-optical (EO) components, and/or wireless communication components coupled to the upstream ports 950 and/or downstream ports 920 for communication of data via electrical, optical, and/or wireless communication networks.

The processor 930 is implemented by hardware and software. The processor 930 may be implemented as one or more CPU chips, cores (e.g., as a multi-core processor), field-programmable gate arrays (FPGAs), application specific integrated circuits (ASICs), digital signal processors (DSPs), or any combination of the foregoing. The processor 930 is in communication with the downstream ports 920, Tx/Rx 910, upstream ports 950, and memory 932. The processor 930 comprises a sticky module 914. The sticky module 914 may implement one or more of the disclosed embodiments described herein.

In an example, the sticky module 914 can recognize that an anycast address is associated with a sticky service and include a Sticky-Dst-SubTLV in a packet header, for example a IPv6 destination options header, so that further packets of the flow can be routed to the same egress router even if a UE moves between 5G networks. In another example, the sticky module 914 copies a packet header from an incoming packet into subsequent outgoing packets in order to copy the Sticky-Dst-SubTLV to cause ingress routers to forward the subsequent packets to the same egress router even if a UE moves between 5G networks. In another example, the sticky module 914 recognizes that an anycast address is associated with a sticky service, stores the egress address in a sticky service table, and shares the sticky service table entries with other ingress routers to cause ingress routers to forward the subsequent packets to the same egress router even if a UE moves between 5G networks. In another example, the sticky module 914 registers anycast addresses and configures various network routers to support sticky service management. Accordingly, the sticky module 914 may be configured to perform mechanisms to address one or more of the problems discussed above. As such, the sticky module 914 improves the functionality of the network element 900 as well as addresses problems that are specific to the telecommunication arts. Further, the sticky module 914 effects a transformation of the network element 900 to a different state. Alternatively, the sticky module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), and other optical and/or electrical memory systems suitable for this task. The memory 932 may be used as an over-flow data storage device, to store programs when such programs are selected for execution, and to store instructions and data that are read during program execution.

Figure 10:
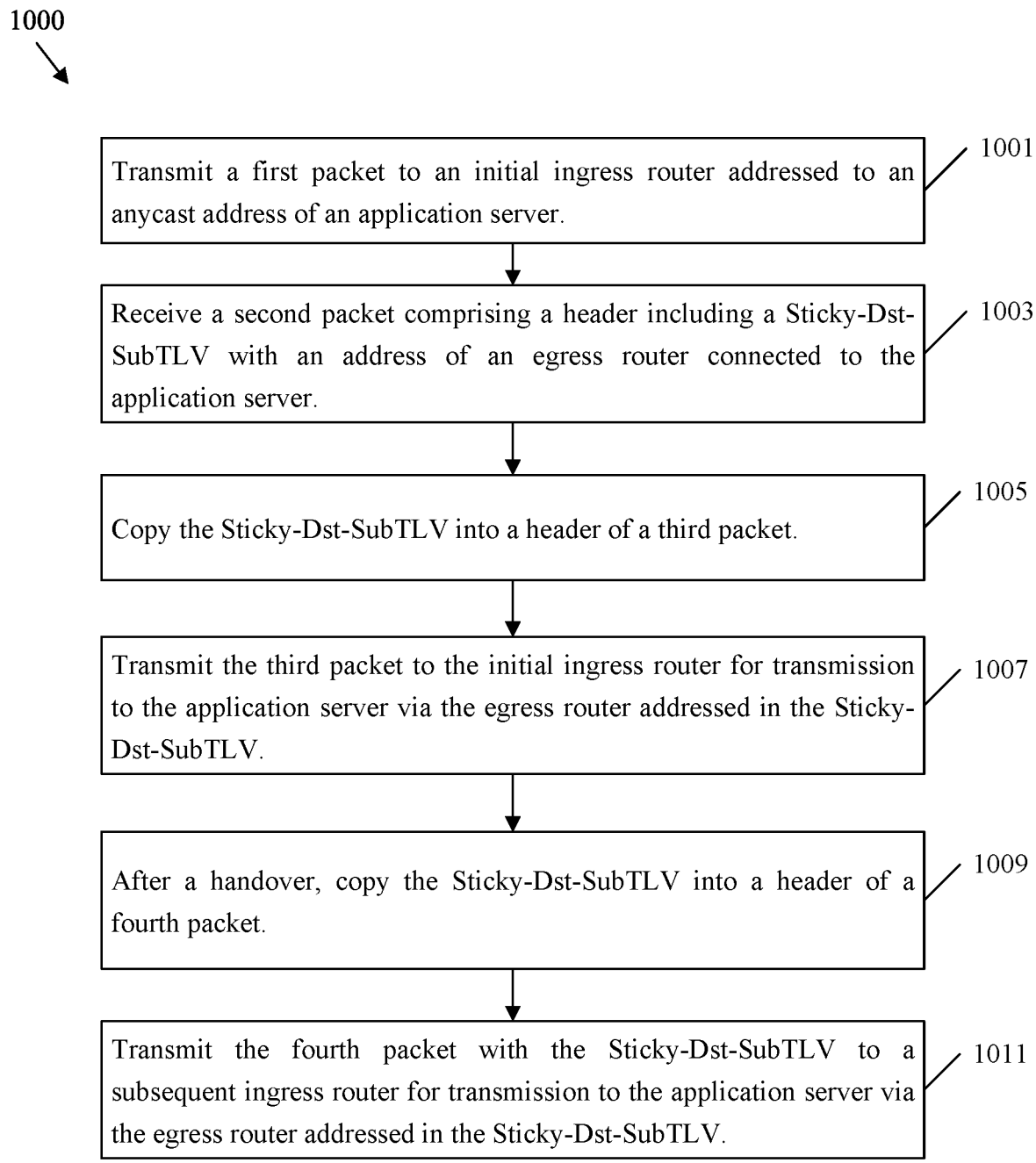
FIG. 10 is a flowchart of an example method of managing sticky services at a user equipment (UE).

FIG. 10 is a flowchart of an example method 1000 of managing sticky services at a UE, such as a UE 101 in network 100. The method 1000 may be employed in conjunction with method 200, 1100, and/or 1300, for example by employing a IPv6 destination options header 500, a Sticky-Dst-SubTLV structure 600, and/or a sticky service ID 700. Method 1000 may begin when a UE determines to communicate a flow of data with an application server by using a sticky service.

At step 1001, the UE includes an anycast address for the application server as the destination address for a first packet. The UE then transmits the first packet via a 5G network to an initial ingress router in an IP network for forwarding to the application server with the anycast address. The UE may be communicatively connected to an initial 5G site. Therefore, the first packet may be transmitted to the initial ingress router while the UE is attached to an initial PSA at an initial 5G site.

At step 1003, the UE receives a second packet from the application server. The second packet comprises a header including a Sticky-Dst-SubTLV with an address of an egress router attached or connected to the application server. For example, the header of the second packet may be an IPv6 destination options header, the Sticky-Dst-SubTLV can be included in the IPv6 destination options header.

At step 1005, the UE sends another packet of the flow. The UE copies the Sticky-Dst-SubTLV from the second packet into a header of a third packet. This copies the Sticky-Dst-SubTLV into the header of the third packet.

At step 1007, the UE transmits the third packet with the Sticky-Dst-SubTLV to the initial ingress router. The initial ingress router then transmits the third packet to the application server via the egress router addressed in the Sticky-Dst-SubTLV. In this example, the third packet may also be transmitted to the initial ingress router while the UE is attached to an initial PSA at an initial 5G site.

Subsequent to step 1007, the UE moves to another 5G site. The UE then undergoes a 5G handover from the initial PSA at an initial 5G site to a subsequent PSA at a subsequent 5G site. After the handover, the UE copies the header including the Sticky-Dst-SubTLV into a header of a fourth packet at step 1009.

At step 1011, the UE transmits the fourth packet via the subsequent 5G site to a subsequent ingress router in the IP network. The subsequent ingress router receives the fourth packet with the Sticky-Dst-SubTLV. Hence, the subsequent ingress router transmits the fourth packet to the application server via the egress router addressed in the Sticky-Dst-SubTLV. Since the fourth packet is transmitted after the handover, the fourth packet is transmitted to the subsequent ingress router while the UE is attached to a subsequent PSA at a subsequent 5G site. The first packet, the second packet, the third packet, and the fourth packet are associated with the same flow between the UE and the application server. Further, because the UE copies the Sticky-Dst-SubTLV from received packets into transmitted packets, the packets in the flow are forwarded to the same egress router regardless of handovers between 5G networks.

In an example, the first packet, the second packet, and the third packet are encapsulated during communication over a tunnel, wherein the egress router is coupled to the ingress router via an internet protocol version four (IPv4) network, and wherein the Sticky-Dst-SubTLV is included in a variable length options field in a Generic Network Virtualization Encapsulation (GENEVE) header. In another example, the first packet, the second packet, and the third packet are encapsulated during communication over a tunnel, wherein the egress router is coupled to the ingress router via an internet protocol version four (IPv4) network, and wherein the Sticky-Dst-SubTLV is included in an IPv6 destination options header field in an IPv6 header.

Figure 11:
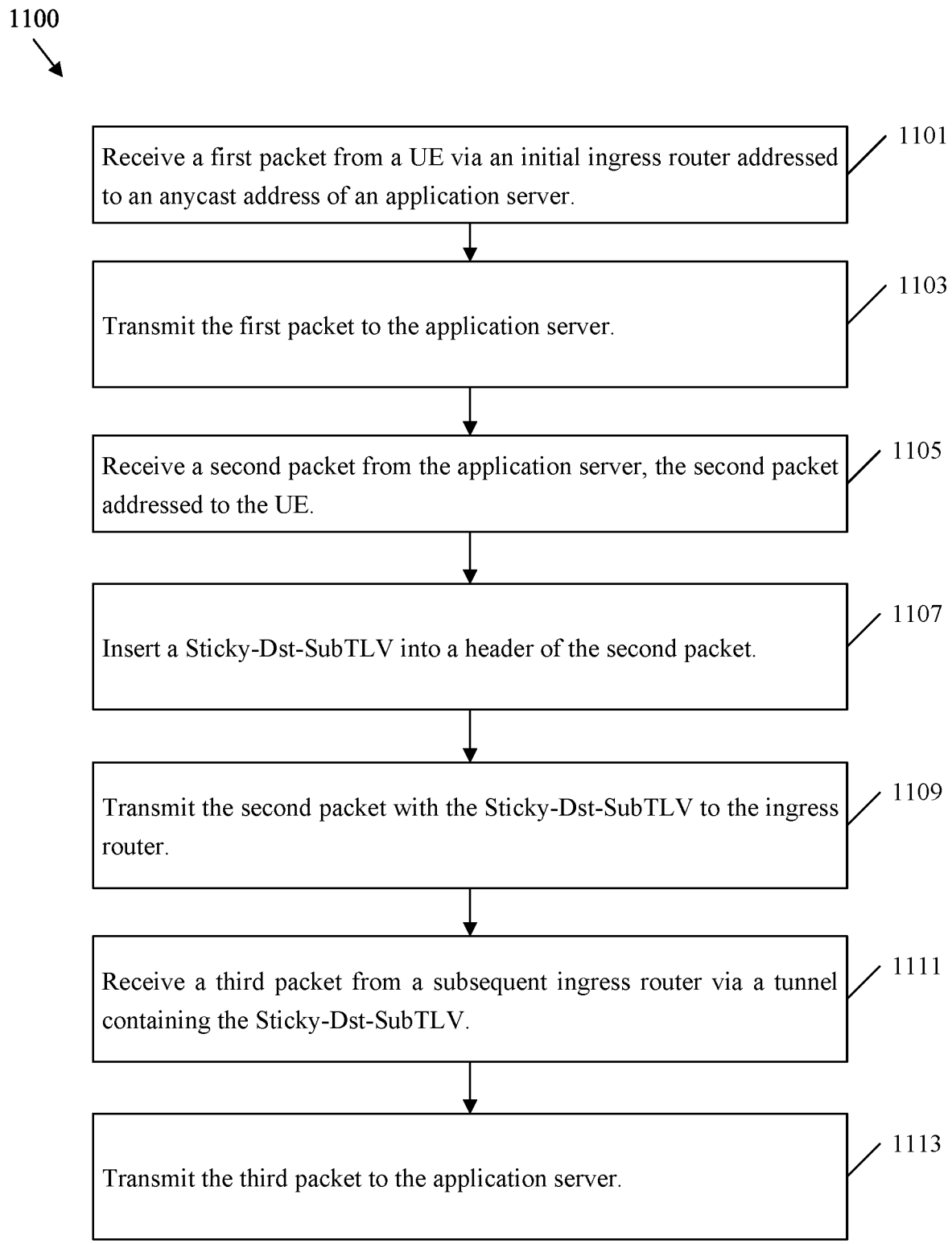
FIG. 11 is a flowchart of an example method of managing sticky services at an egress router.

FIG. 11 is a flowchart of an example method 1100 of managing sticky services at an egress router, such as an egress router 131 in network 100. The method 1100 may be employed in conjunction with method 200, 1000, and/or 1300, for example by employing a IPv6 destination options header 500, a Sticky-Dst-SubTLV structure 600, and/or a sticky service ID 700. Method 1100 may begin when an egress router recognizes a packet as containing an anycast address associated with a sticky service. For example, method 1100 may be performed in response to method 1000 and/or method 1300.

At step 1101, the egress router receives a first packet from an initial ingress router addressed to an anycast address of an application server, for example via an IP tunnel. For example, the first packet may be generated by a UE at an initial 5G site and forwarded to an initial ingress router coupled to the initial 5G site. The initial ingress router then forwards the first packet to the egress router via an IP tunnel. Accordingly, the first packet is received from the initial ingress router while the UE is attached to an initial PSA at an initial 5G site. The egress router then transmits the first packet to the application server at step 1103.

The egress router receives a second packet from the application server at step 1105. The second packet is addressed to the UE, which can be reached via the initial ingress router. The egress router may have an ACL that is configured to filter packet streams for packets that include anycast addresses associated with sticky services.

Accordingly, the egress router recognizes the source address of the second packet is the anycast address of a sticky service. As such the egress router inserts a Sticky-Dst-SubTLV into a header of the second packet at step 1107. The header of the second packet may be an IPv6 destination options header, and the Sticky-Dst-SubTLV can be inserted into the IPv6 destination options header. The Sticky-Dst-SubTLV comprises an address of the egress router. The egress router then transmits the second packet with the Sticky-Dst-SubTLV to the UE via the ingress router at step 1109, for example via an IP tunnel.

Subsequent to step 1109, the UE moves to another 5G site. The UE then undergoes a 5G handover from the initial PSA at an initial 5G site to a subsequent PSA at a subsequent 5G site. At step 1111, the egress router receives a third packet from the subsequent ingress router coupled to the subsequent 5G site, for example via an IP tunnel to the egress router. The third packet may be addressed to the anycast address of the application server. But the third packet contains the Sticky-Dst-SubTLV, which causes the subsequent ingress router to route the third packet to the same egress router as the first and second packets instead of sending the third packet to the closest egress router to the subsequent ingress router. Since the third packet is received after the UE undergoes a 5G handover, the third packet is received from the subsequent ingress router while the UE is attached to a subsequent PSA at the subsequent 5G site. At step 1113, the egress router transmits the third packet to the application server. The first packet, the second packet, and the third packet are associated with the same flow between the UE and the application server. Further, because the UE copies the Sticky-Dst-SubTLV from received packets into transmitted packets, the packets in the flow are forwarded to the same egress router regardless of handovers between 5G networks.

In an example, the first packet, the second packet, the third packet and the fourth packet are encapsulated during communication over a tunnel, wherein the egress router is communicatively connected to the ingress router via an internet protocol version four (IPv4) network, and wherein the Sticky-Dst-SubTLV is included in a variable length options field in a Generic Network Virtualization Encapsulation (GENEVE) header. In another example, the first packet, the second packet, the third packet, and the fourth packet are encapsulated during communication over a tunnel, wherein the egress router is communicatively connected to the ingress router via an internet protocol version four (IPv4) network, and wherein the Sticky-Dst-SubTLV is included in an IPv6 destination options header field in an IPv6 header.

Figure 12:
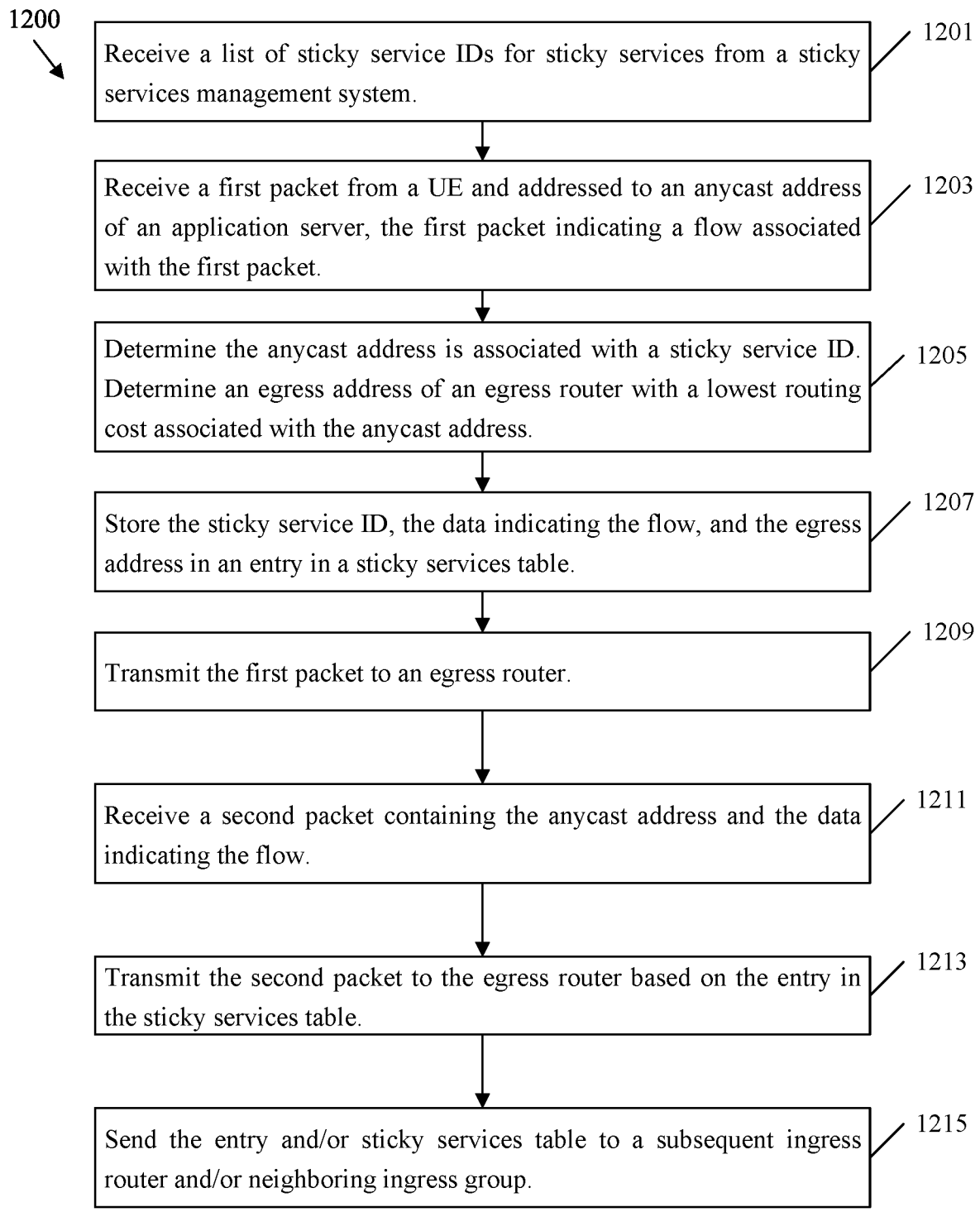
FIG. 12 is a flowchart of an example method of managing sticky services at an ingress router.

FIG. 12 is a flowchart of an example method 1200 of managing sticky services at an ingress router, such as an initial ingress router 113 in network 100. The method 1200 may be employed in conjunction with method 300, 400, and/or 1300, for example by employing a sticky service table 800.

Method 1200 may begin when an ingress router is configured to check packets for treatment according to sticky services. At step 1201, the ingress router receives a list of sticky service IDs for sticky services from a sticky services management system, for example as a result of method 1300. In an example, a sticky service identifier ID can be the anycast address of the application server. In a further example, a sticky services management system, such as EC sticky services management system 125, may configure an ACL on the ingress router with sticky service IDs and/or anycast addresses of various sticky services. The ingress router then filters packets according to the ACL to identify packets that should receive sticky service treatment.

At step 1203, the ingress router receives a first packet from a UE and addressed to an anycast address of an application server. The first packet may also contain data indicating a flow associated with the first packet. For example, the data indicating the flow may be a flow label, a mobile device address of the UE, and/or other flow identifying information.

At step 1205, the ingress router determines the anycast address is associated with a sticky service ID, for example by comparing the destination anycast address with the sticky service addresses in the ACL configured by the sticky services management system. Assuming the first packet is associated with a new flow, the ingress node then determines an egress address of an egress router with a lowest routing cost associated with the anycast address.

At step 1207, the ingress router stores the sticky service ID, the data indicating the flow, and the egress address in an entry in a sticky service table to indicate future packets in the flow should be considered as part of a sticky service. In an example, the entry in the sticky service table contains a timer. The timer can be used to remove stale flows from the sticky service table. Accordingly, the ingress router can be configured to remove the entry in the sticky service table when the timer expires.

At step 1209, the ingress router transmits the first packet to the egress router associated with the anycast address with a lowest routing cost.

At step 1211, the ingress router receives a second packet containing the anycast address and the data indicating the flow. The ingress router determines the second packet is associated with a sticky service based on the ACL and determines the second packet is part of an existing flow based on the sticky service table. Accordingly, the ingress router transmits the second packet to the egress router based on a correspondence between the sticky service ID, the flow label, and the egress address in the sticky service table at step 1213. Subsequent packets of the flow can be forwarded in a similar manner.

At step 1215, the ingress router sends the sticky services entry and/or the entire sticky service table to a specified subsequent ingress router and/or a neighboring ingress group. For example, the ingress router may periodically advertise the sticky service table to neighboring ingress routers within a neighboring ingress group to support routing subsequent packets to the egress server upon movement of the UE between 5G sites. In another example, the ingress router may receive a notification from a 5G EC Management system. The notification may indicate the UE has moved from an initial PSA at an initial 5G site to a subsequent PSA at a subsequent 5G site. In this example, the ingress router can send the entry in the sticky service table to a subsequent ingress router attached to the subsequent 5G site to support routing subsequent packets to the egress server.

In an example, the first packet and the second packet are encapsulated during communication over a tunnel, wherein the egress router is communicatively connected to the ingress router via an internet protocol version four (IPv4) network, and wherein the Sticky-Dst-SubTLV is included in a variable length options field in a Generic Network Virtualization Encapsulation (GENEVE) header. In another example, the first packet and the second packet are encapsulated during communication over a tunnel, wherein the egress router is communicatively connected to the ingress router via an internet protocol version four (IPv4) network, and wherein the Sticky-Dst-SubTLV is included in an IPv6 destination options header field in an IPv6 header.

Figure 13:
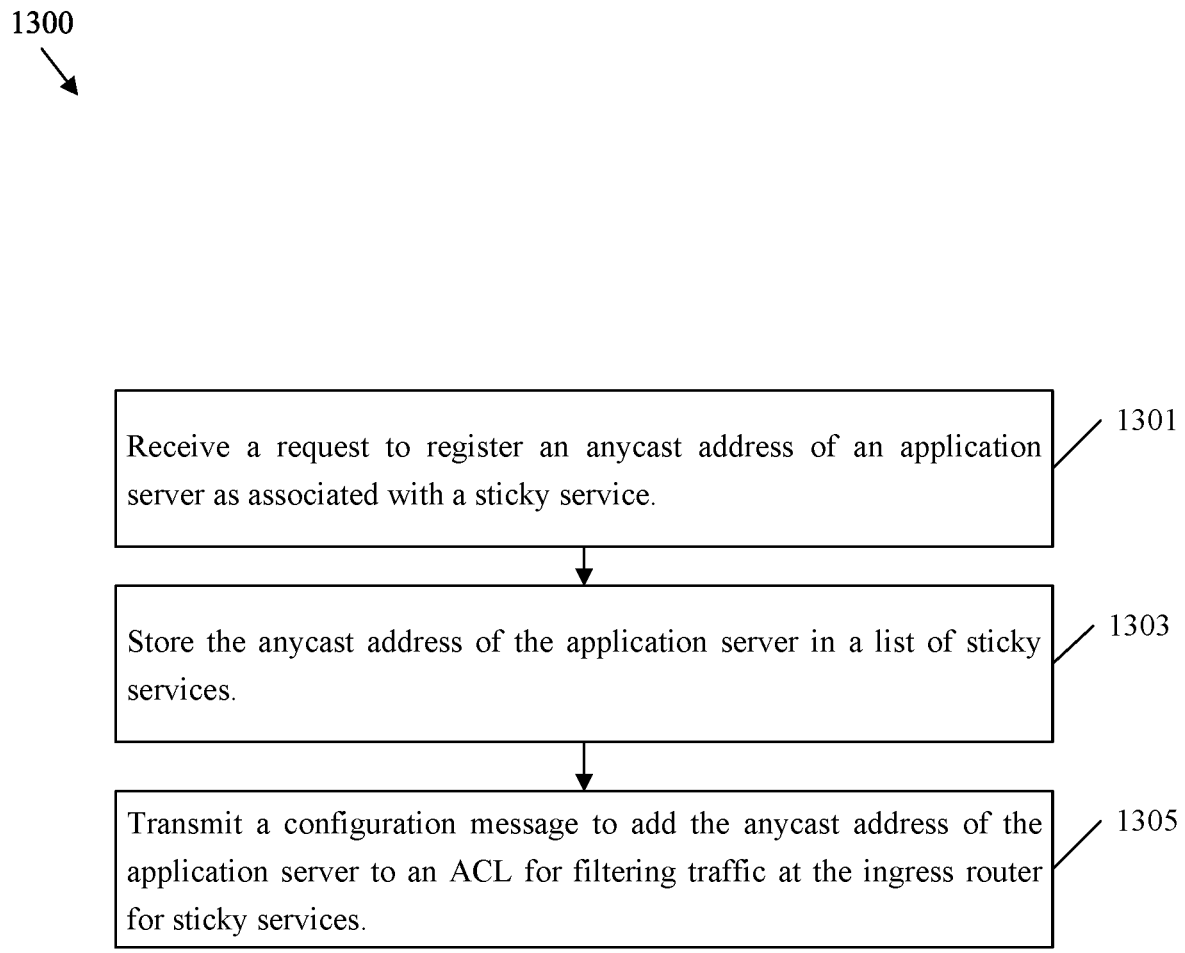
FIG. 13 is a flowchart of an example method of managing sticky services at an edge computing sticky service management system.

FIG. 13 is a flowchart of an example method 1300 of managing sticky services at an edge computing sticky service management system, such as an EC sticky service management system in network 100. The method 1300 may be employed in conjunction with method 200, 300, 400, 1000, 1100, and/or 1200, for example by employing a IPv6 destination options header 500, a Sticky-Dst-SubTLV structure 600, a sticky service ID 700, and/or a sticky service table 800.

Method 1300 may be initiated when an EC sticky services management system determines to manage sticky services for an edge computing network. At step 1301, the EC sticky services management system receives a request to register an anycast address of an application server as associated with a sticky service. In some examples, the anycast address of the application server is a sticky service ID for flows addressed to the anycast address.

At step 1303, the EC sticky services management system stores the anycast address of the application server in a list of sticky services. At step 1305, the EC sticky services management system transmits a configuration message to add the anycast address of the application server to an ACL for filtering traffic at an ingress router for sticky services. The EC sticky services management system may also transmit the configuration message to add the anycast address of the application server to an ACL for filtering traffic at an egress router for sticky services. In some examples, the ingress router is coupled to a 5G site, and the egress router is coupled to the application server.

Figure 14:
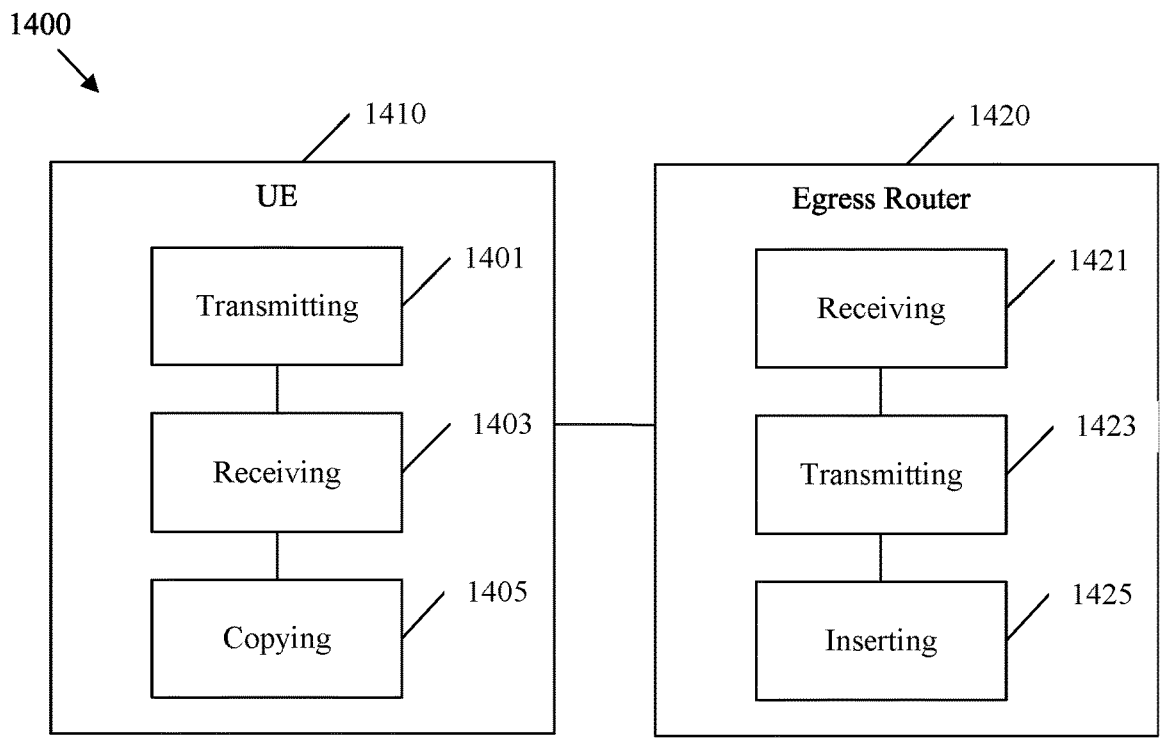
FIG. 14 is a schematic diagram of an example 5G edge computing system for managing sticky services with UE interaction.

FIG. 14 is a schematic diagram of an example 5G edge computing system 1400 for managing sticky services with UE interaction. For example, the 5G edge computing system 1400 may be implemented by corresponding components in a 5G edge computing network 100 and/or by a network element 900. In an example, the 5G edge computing system 1400 may employ method 200, 1000, 1100, and/or 1300, for example by employing a IPv6 destination options header 500, a Sticky-Dst-SubTLV structure 600, and/or a sticky service ID 700.

The 5G edge computing system 1400 comprises a UE 1410. The UE 1410 comprises a transmitting module 1401 for transmitting a first packet to an initial ingress router addressed to an anycast address of an application server. The 5G edge computing system 1400 further comprises a receiving module 1403 for receiving a second packet from the application server, the second packet comprising a header including a Sticky-Dst-SubTLV with an address of an egress router attached to the application server. The 5G edge computing system 1400 further comprises a copying module 1405 for copying the Sticky-Dst-SubTLV into a header of a third packet. The transmitting module 1401 is further for transmitting the third packet with the Sticky-Dst-SubTLV to the initial ingress router for transmission to the application server via the egress router addressed in the Sticky-Dst-SubTLV. The components of the UE 1410 may be further configured to perform any of the steps of method 1000.

The 5G edge computing system 1400 also comprises an egress router 1420. The egress router 1420 comprises a receiving module 1421 for receiving a first packet from a user equipment (UE) via an initial ingress router addressed to an anycast address of an application server. The egress router 1420 further comprises a transmitting module 1423 for transmitting the first packet to the application server. The receiving module 1421 is further for receiving a second packet from the application server, the second packet addressed to the UE. The egress router 1420 further comprises an inserting module 1425 for inserting a Sticky-Dst-SubTLV into a header of the second packet. The transmitting module 1423 is further for transmitting the second packet with the Sticky-Dst-SubTLV to the ingress router. The components of the egress router 1420 may be further configured to perform any of the steps of method 1100.

Figure 15:
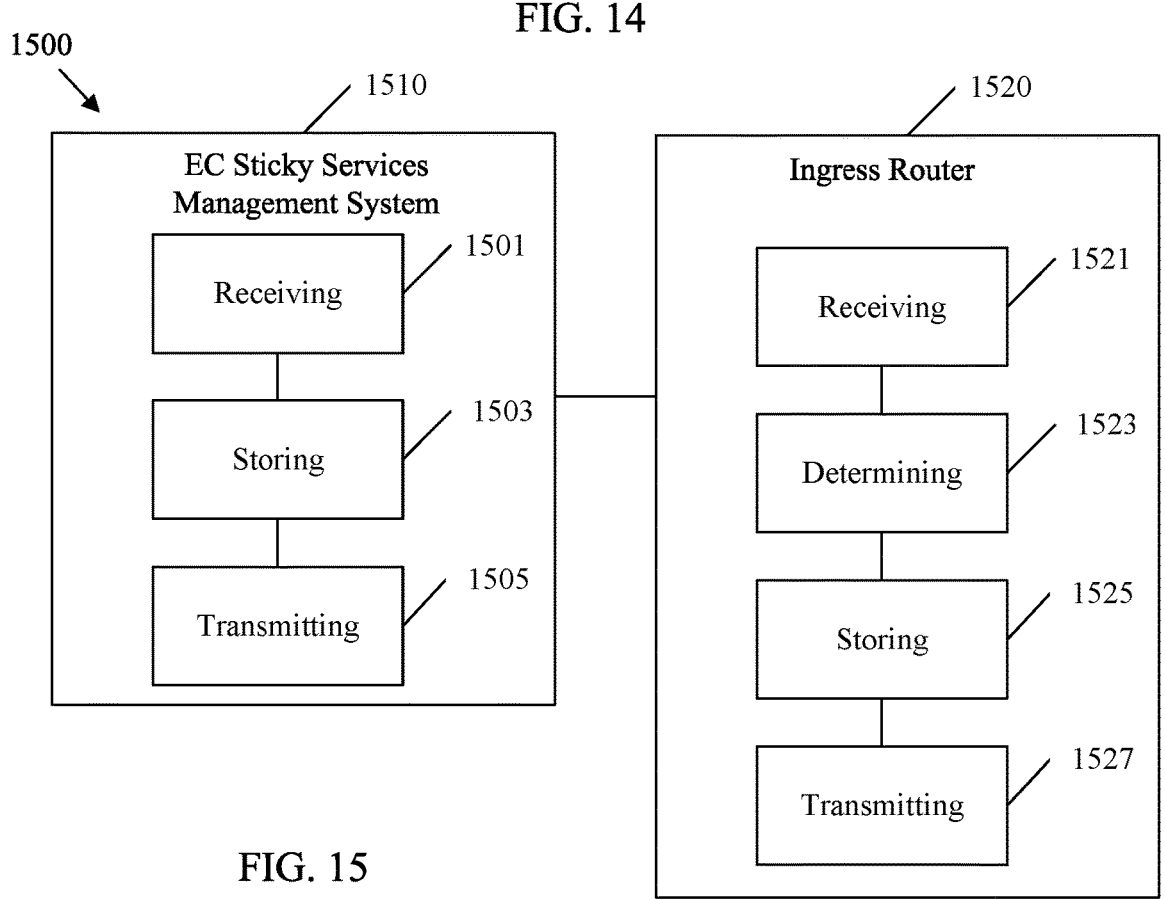
FIG. 15 is a schematic diagram of an example 5G edge computing system for managing sticky services without UE interaction.

FIG. 15 is a schematic diagram of an example 5G edge computing system 1500 for managing sticky services without UE interaction. For example, the 5G edge computing system 1500 may be implemented by corresponding components in a 5G edge computing network 100 and/or by a network element 900. In an example, the 5G edge computing system 1500 may employ method 300, 400, 1200, and/or 1300, for example by employing a sticky service table 800.

The 5G edge computing system 1500 comprises an EC sticky services management system 1510. The EC sticky services management system 1510 comprises a receiving module 1501 for receiving a request to register an anycast address of an application server as associated with a sticky service. The EC sticky services management system 1510 further comprises a storing module 1503 for storing the anycast address of the application server in a list of sticky services. The EC sticky services management system 1510 further comprises a transmitting module 1505 for transmitting a configuration message to add the anycast address of the application server to an ACL for filtering traffic at the ingress router for sticky services. The components of the EC sticky services management system 1510 may be further configured to perform any of the steps of method 1300.

The 5G edge computing system 1500 comprises an ingress router 1520. The ingress router 1520 comprises a receiving module 1521 for receiving a first packet from a user equipment (UE) and addressed to an anycast address of an application server, wherein the first packet contains data indicating a flow associated with the first packet. The ingress router 1520 further comprises a determining module 1523 for determining the anycast address is associated with a sticky service ID. The determining module 1523 is further for determining an egress address of an egress router with a lowest routing cost associated with the anycast address. The ingress router 1520 further comprises a storing module 1525 for storing the sticky service ID, the data indicating the flow, and the egress address in an entry in a sticky service table. The ingress router 1520 further comprises a transmitting module 1527 for transmitting the first packet to an egress router associated with the anycast address with a lowest routing cost. The receiving module 1521 is further for receiving a second packet containing the anycast address and the data indicating the flow. The transmitting module 1527 is further for transmitting the second packet to the egress router based on a correspondence between the sticky service ID, the flow label, and the egress address in the sticky service table. The components of the ingress router 1520 may be further configured to perform any of the steps of method 1200.

In an embodiment, a method is implemented in an ingress router, the method comprising: receiving, by a receiver of the ingress router, a first packet from a user equipment (UE) addressed to an anycast address of an application server, the first packet containing a flow label; searching, by a processor of the ingress router, a sticky destination sub type length value (Sticky-Dst-SubTLV) table for an entry containing the flow label; and transmitting, by a transmitter of the ingress router, the first packet toward an egress router associated with the anycast address of the application server. In an example, the method further comprises obtaining, by the processor, an address of the egress router from the entry containing the flow label in the Sticky-Dst-SubTLV table; and encapsulating, by the processor, the first packet by adding an address of the ingress router as a source address of the first packet and the address of the egress router as the destination address of the first packet. In another example, the method further comprises selecting, by the processor, the egress router based on a lowest routing cost algorithm when the Sticky-Dst-SubTLV table does not contain an entry containing the flow label; obtaining, from a memory of the egress router, an address of the egress router; and encapsulating, by the processor, the first packet by adding an address of the ingress router as a source address of the first packet and the address of the egress router as the destination address of the first packet. In an example, the ingress router is communicatively connected to the egress router via an internet protocol version four (IPv4) network, and wherein encapsulating the first packet includes inserting a Sticky-Dst-SubTLV containing the address of the egress router into a variable length options field in a Generic Network Virtualization Encapsulation (GENEVE) header. In an example, the ingress router is communicatively connected to the egress router via an internet protocol version six (IPv6) network, and wherein encapsulating the first packet includes inserting a Sticky-Dst-SubTLV containing the address of the egress router into an IPv6 destination options header field in an IPv6 packet. In an example, the method further comprises receiving, by the receiver, a second packet from the egress router; decapsulating, by the processor, the second packet to obtain a header containing the Sticky-Dst-SubTLV; storing, by the memory, the Sticky-Dst-SubTLV in the entry in the Sticky-Dst-SubTLV table; and transmitting, by the transmitter, the second packet toward the UE. In some examples, the entry in the sticky service table includes a timer. The method may further comprise refreshing the timer in the entry each time the Sticky-Dst-SubTLV is received in a packet and removing the entry when the timer expires.

Figure 17:
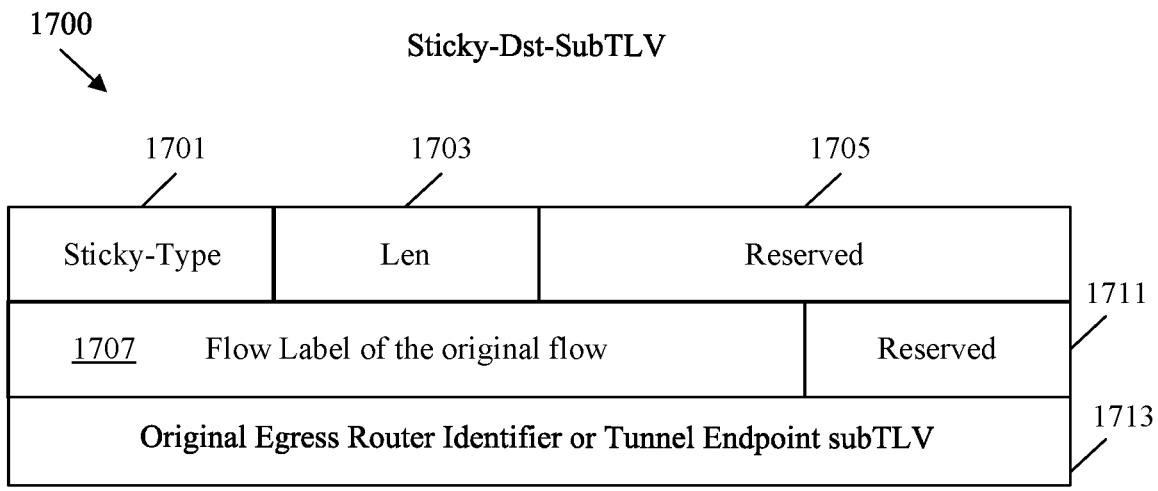
FIG. 17 is another example Sticky-Dst-SubTLV structure.

FIG. 17 is another example Sticky-Dst-SubTLV structure 1700. The Sticky-Dst-SubTLV structure 1700 is similar to the Sticky-Dst-SubTLV structure 600, and can be used in a similar manner to the Sticky-Dst-SubTLV structure 600. For example, the Sticky-Dst-SubTLV structure 1700 can be included in an IPv6 destination options header 500 and/or 1600. The Sticky-Dst-SubTLV structure 1700 can include a sticky-type field 1701 and a length field 1703, which may be substantially similar to the sticky-type field 601 and length field 603, respectively, of the Sticky-Dst-SubTLV structure 600. The Sticky-Dst-SubTLV structure 1700 also includes a reserved field 1705, which may be sixteen bits long and may extend from bit position sixteen to bit position thirty-one. The reserved field 1705 may be reserved for other functions. The Sticky-Dst-SubTLV structure 1700 also includes a flow label field 1707, which may be twenty bits long and may extend from bit position zero to bit position nineteen. The flow label field 1707 can be set to a value to indicate the flow that should be considered to be sticky. If the Sticky-Dst-SubTLV is first generated, the flow label field 1707 can be set to the same flow label extracted from flow label field 1605 in a received packet's IPv6 fixed header. The Sticky-Dst-SubTLV structure 1700 also includes a reserved field 1711, which may be twelve bits long and may extend from bit position twenty to bit position thirty-one. The reserved field 1711 may be reserved for other functions. The Sticky-Dst-SubTLV structure 1700 also includes an egress router or tunnel endpoint field 1711, which may be thirty-two bits long and may extend from bit position zero to bit position thirty-one. The egress router or tunnel endpoint field 1711 can be set equal to one to indicate the thirty-two-bit identifier used to represent the egress router. The original egress router identifier may assume that in a 5G Edge computing environment, all the routers have a thirty-two-bit identifier even though they might use an IPv6 address. In an example, the sticky-type field 1701 can be set equal to two to indicate a Tunnel Endpoint SubTLV used to represent the Egress router from the original site before the UE moves to the new site.

Figure 18:
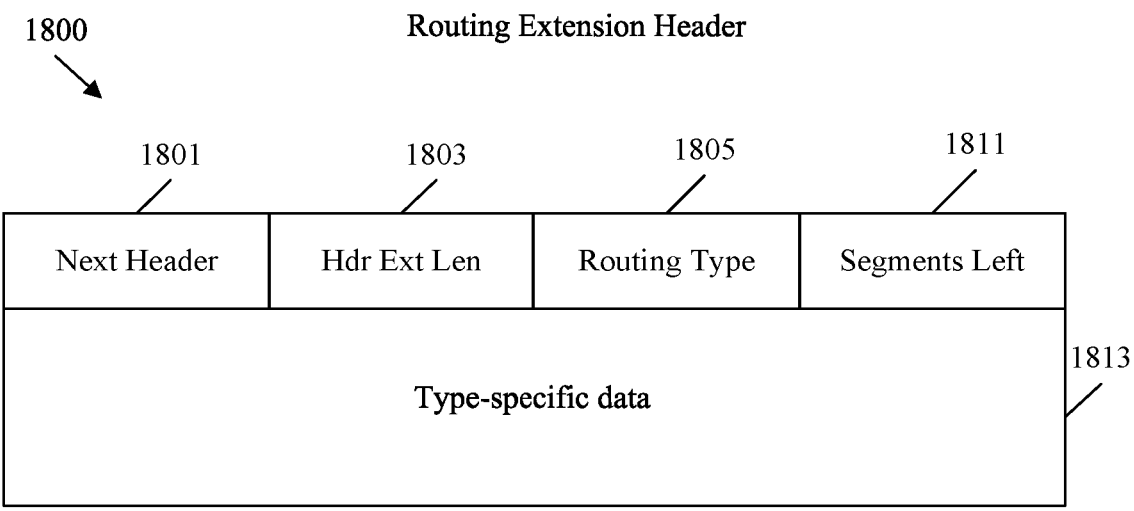
FIG. 18 is an example routing extension header for use with sticky services.

FIG. 18 is an example of a routing extension header 1800 for use with sticky services. The routing extension header 1800 is an extension header placed between the fixed header 1700 and the upper-layer protocol header, and can be used to contain a Sticky-Dst-SubTLV, such as Sticky-Dst-SubTLV structure 600 and/or 1700. The routing extension header 1800 includes a next header field 1801, which may be eight bits long and may extend from bit position zero to bit position seven. The next header field 1801 can be set to identify the type of header immediately following the routing extension header 1800. The routing extension header 1800 also includes a header extension length field 1803, which may be eight bits long and may extend from bit position eight to bit position fifteen. The header extension length field 1803 may be set to indicate the length of the routing extension header 1800 in eight octet units, not including the first eight octets. The routing extension header 1800 also includes routing type field 1805, which may be eight bits long and may extend from bit position sixteen to bit position twenty-three. The routing type field 1805 may be set to a value to indicate a particular routing extension header 1800 variant. The routing extension header 1800 also includes a segments left field 1811, which may be eight bits long and may extend from bit position twenty-four to bit position thirty-one. The segments left field 1811 can be set to indicate a number of route segments remaining, such as a number of explicitly listed intermediate nodes still to be visited before reaching a final destination. The routing extension header 1800 also includes a type specific data field 1813, which may be of variable length and of a format determined by the routing type as indicated in the routing type field 1805. For example, the type specific data field 1813 can be of a length such that the complete routing extension header 1800 is an integer multiple of eight octets long. In the present example, a Sticky-Dst-SubTLV, such as Sticky-Dst-SubTLV structure 600 and/or 1700, is inserted into type specific data field 1813 of the routing extension header 1800 contained in an IPv6 header. The routing extension header 1800 may be used by an IPv6 source to list one or more intermediate nodes to be visited on the way to a packet's destination. The routing extension header 1800 can be identified by a next header value of forty three in the immediately preceding header.

This section describes a solution that can prioritize egress routers for receiving packets. For example, one Edge Computing server may have instances attached to four different egress routers denoted as R1, R2, R3 and R4 respectively. For packets of a flow A, the priority is sending to the instance attached to the R1 (e.g. egress router 131). When R1 fails, which can be caused by various factors such as lost connectivity or other malfunction, the packets of the flow A can be forwarded to an instance attached to R2, R3 or R4 (e.g. one of egress router 135), depending on the network cost. The following is an example procedure to achieve this type of location preferred forwarding for ANYCAST.

Each server instance may be configured with multiple ANYCAST addresses. Location preferred ANYCAST addresses may be used to make a specific location preferred. When failure occurs at the preferred location, the packets are forwarded to other locations. For example, for the Flow A, three different ANYCAST addresses are allocated and denoted as L1, L2, L3, L4. ANYCAST address L1 has the lowest cost, for example, when attached to R1 L1 has a higher cost, such as thirty, when attached to R2, R3 and R4. ANYCAST L2 has the lowest cost for the instance attached to R2, and may have a higher cost for the instance attached to R1 and R3 respectively. ANYCAST L3 has the lowest cost for the instance attached to R3, and has a higher cost for the instance attached to R1, R2, and R4 respectively. ANYCAST L4 has the lowest cost for the instance attached to R4 and has a higher cost for the instance attached to R1, R2, and R3 respectively.

For a sticky service that should be sent to the instance attached to R1, the ingress router directly connected to the 5G PSA can replace the destination address with L1 for steering the packets to R1. If R1 fails, the packets of the Flow A is sent to R2 or R3 depending the network cost. For the procedures described above, the egress router R1 may insert L1 into the Egress-Router-ID of the Sticky-Dst-SubTLV. This causes the ingress router at the new 5G site to send packets to L1, which goes to R1 if there is no failure at R1. Otherwise, the packets are forwarded to the other egress routers for the instance. Alternatively, a local DNS resolver can reply L1, L2, or L3 depending on where the DNS request come from to steer packets to the preferred site for the Edge Computing server instance.

The techniques described herein applies not only to 5G Edge Networks, but also to other network environments such as data center networks, enterprise networks, and carrier backbone networks.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a user equipment (UE), the method comprising:
  transmitting, by the UE, a first packet addressed to an anycast address of a server, the first packet associated with a flow of a sticky service;
  receiving, by the UE from the server, a second packet of the flow comprising an Internet Protocol (IP) extension header with a sticky destination sub type length value (Sticky-Dst-SubTLV), the Sticky-Dst-SubTLV comprising an address of an egress router attached to the server;
  copying, by the UE, the Sticky-Dst-SubTLV into an IP extension header of a third packet of the flow; and transmitting, by the UE, the third packet with the Sticky-Dst-SubTLV.

2. The method of claim 1, wherein the IP extension header of the second packet is an Internet Protocol version six (IPv6) destination options header, and wherein the Sticky-Dst-SubTLV is included in the IPv6 destination options header.

3. The method of claim 1, wherein the first packet, the second packet and the third packet are transmitted by the UE to a first Protocol Data Unit (PDU) session anchor (PSA) in a first mobile network site, the method further comprising:
copying, by the UE, the Sticky-Dst-SubTLV into an IP extension header of a fourth packet of the flow; and
transmitting, by the UE to a second PDU PSA in a second mobile network site, the fourth packet with the Sticky-Dst-SubTLV for delivering the fourth packet to the server via the egress router specified in the Sticky-Dst-SubTLV.

4. The method of claim 1, wherein the Sticky-Dst-SubTLV comprises a sticky type.

5. The method of claim 1, wherein the Sticky-Dst-SubTLV comprises a flow label.

6. The method of claim 1, wherein the first packet is associated with the flow of the sticky service by a sticky service identifier (ID).

7. A method implemented by a server, the method comprising:
receiving, by the server from a user equipment (UE) via a data network, a first packet comprising an anycast address of the server and associated with a flow of a sticky service;
inserting, by the server, a sticky destination sub type length value (Sticky-Dst-SubTLV) into an Internet Protocol (IP) extension header of a second packet of the flow, the Sticky-Dst-SubTLV comprising an address of an egress router attached to the server; and
transmitting, by the server to the UE through the data network, the second packet with the Sticky-Dst-SubTLV.

8. The method of claim 7, wherein the Sticky-Dst-SubTLV comprises a sticky type.

9. The method of claim 7, wherein the Sticky-Dst-SubTLV comprises a flow label.

10. The method of claim 7, wherein the IP extension header of the second packet is an Internet Protocol version six (IPv6) destination options header, and wherein the Sticky-Dst-SubTLV is inserted into the IPv6 destination options header.

11. The method of claim 7, wherein before transmitting the first packet, the first packet is encapsulated by an ingress router in a tunnel whose outer destination address is set to an egress address extracted from the Sticky-Dst-SubTLV.

12. The method of claim 7, wherein the first packet is associated with the flow of the sticky service by a sticky service identifier (ID).

13. A method implemented by an egress router, the method comprising:
receiving, by the egress router from a user equipment (UE) via a first ingress router, a first packet addressed to an anycast address of a server, the first packet associated with a flow of a sticky service;
transmitting, by the egress router, the first packet to the server;
receiving, by the egress router, a second packet of the flow from the server, the second packet addressed to the UE;
inserting, by the egress router, a sticky destination sub type length value (Sticky-Dst-SubTLV) into an Internet Protocol (IP) extension header of the second packet, the Sticky-Dst-SubTLV comprising an address of the egress router; and
transmitting, by the egress router, the second packet with the Sticky-Dst-SubTLV to the first ingress router.

14. The method of claim 13, wherein the IP extension header of the second packet is an Internet Protocol version six (IPv6) destination options header, and wherein the Sticky-Dst-SubTLV is inserted into the IPv6 destination options header.

15. The method of claim 13, wherein the Sticky-Dst-SubTLV comprises a sticky type.

16. The method of claim 13, wherein the Sticky-Dst-SubTLV comprises a flow label.

17. The method of claim 13, wherein the first ingress router is coupled to a first Protocol Data Unit (PDU) session anchor (PSA) in a first mobile network site, and wherein the first packet is received from the first ingress router while traffic from the UE is anchored by the first PDU PSA at the first mobile network site.

18. The method of claim 13, further comprising:
receiving, by the egress router, a third packet of the flow from a second ingress router, wherein the third packet is addressed to the anycast address of the server and comprises the Sticky-Dst-SubTLV; and
transmitting, by the egress router, the third packet to the server.

19. The method of claim 18, wherein the second ingress router is coupled to a second PDU PSA in a second mobile network site, and wherein the third packet is received from the second ingress router while traffic from the UE is anchored to the second PDU PSA at the second mobile network site.

20. The method of claim 13, wherein the first packet is associated with the flow of the sticky service by a sticky service identifier (ID).

* * * * *